(12) United States Patent
Ohno

(10) Patent No.: US 10,174,901 B2
(45) Date of Patent: Jan. 8, 2019

(54) VEHICLE LAMP

(71) Applicant: STANLEY ELECTRIC CO., LTD., Tokyo (JP)

(72) Inventor: Masafumi Ohno, Kawasaki (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/628,009

(22) Filed: Jun. 20, 2017

(65) Prior Publication Data

US 2017/0370546 A1    Dec. 28, 2017

(30) Foreign Application Priority Data

Jun. 22, 2016  (JP) ................. 2016-123935

(51) Int. Cl.

| F21S 41/20 | (2018.01) |
| F21V 5/00 | (2018.01) |
| F21V 5/02 | (2006.01) |
| F21S 41/125 | (2018.01) |
| F21S 41/143 | (2018.01) |
| F21S 41/255 | (2018.01) |
| F21S 41/265 | (2018.01) |
| F21S 41/663 | (2018.01) |
| F21Y 113/00 | (2016.01) |

(52) U.S. Cl.
CPC .......... *F21S 41/285* (2018.01); *F21S 41/125* (2018.01); *F21S 41/143* (2018.01); *F21S 41/255* (2018.01); *F21S 41/265* (2018.01); *F21S 41/663* (2018.01); *F21V 5/007* (2013.01); *F21V 5/02* (2013.01); *F21Y 2113/00* (2013.01)

(58) Field of Classification Search
CPC ...... F21S 41/285; F21S 41/663; F21S 41/265; F21S 41/255; F21S 41/125; F21S 41/143; F21V 5/007; F21V 5/02; F21Y 2113/00
See application file for complete search history.

(56) References Cited

U.S. PATENT DOCUMENTS

| 2006/0198118 A1 | 9/2006 | Eichhorn et al. |
| 2008/0151540 A1 | 6/2008 | Noba |

(Continued)

FOREIGN PATENT DOCUMENTS

| DE | 10 2008 005 488 A1 | 7/2009 |
| DE | 10 2008 027 320 A1 | 12/2009 |
| EP | 2 587 125 A2 | 5/2013 |

(Continued)

OTHER PUBLICATIONS

The extended European search report for the related European Patent Application No. 17176918.5 dated Dec. 5, 2017.

*Primary Examiner* — David V Bruce

(74) *Attorney, Agent, or Firm* — Kenealy Vaidya LLP

(57) ABSTRACT

A vehicle lamp includes a light source including a plurality of light emitting elements or light emitting surfaces, a projection lens that projects light emitted from the light source, and a light distribution adjusting element that adjusts light distribution of the light emitted from the light source, wherein the light distribution adjusting element has a plurality of prisms having different angles of inclined surfaces corresponding to a direction in which the plurality of light emitting elements or light emitting surfaces are arranged, and prism surfaces in which at least one or a plurality of flat surfaces are arranged.

11 Claims, 21 Drawing Sheets

(56) References Cited

U.S. PATENT DOCUMENTS

2009/0086477 A1     4/2009   Noba et al.
2015/0070926 A1*   3/2015   Stefanov ............... F21S 41/143
                                                                          362/538

FOREIGN PATENT DOCUMENTS

| EP | 3 109 539 A1 | 12/2016 |
|----|--------------|---------|
| JP | 2001-266620 A | 9/2001 |
| JP | 2006-522440 A | 9/2006 |

\* cited by examiner

VEHICLE LAMP

CROSS-REFERENCE TO RELATED APPLICATION

Priority is claimed on Japanese Patent Application No. 2016-123935, filed Jun. 22, 2016, the contents of which are incorporated herein by reference.

BACKGROUND OF THE INVENTION

Field of the Invention

The present invention relates to a vehicle lamp.

Description of Related Art

In a related art, vehicle lamps mounted on vehicles each include a light source including a plurality of light emitting elements, and a projection lens configured to project light emitted from the light source (for example, see Japanese Unexamined Patent Application, First Publication No. 2001-266620 and Published Japanese Translation No. 2006-522440 of the PCT International Publication). Among them, a variable light distribution headlamp (ADB), in which a plurality of light emitting elements such as light emitting diodes (LEDs) or the like are arranged on a surface thereof, configured to variably control distribution of light by switching the light emitting elements being operated have been developed. ADB is a technology of recognizing a preceding vehicle, an oncoming vehicle, a pedestrian, or the like using a vehicle-mounted camera, and enlarging a forward field of vision of a driver at nighttime without giving glare to the preceding driver or pedestrian.

Incidentally, when the plurality of light emitting elements that constitute the light source are arranged on the surface, it is extremely difficult to dispose the light emitting elements in parallel without a gap. For this reason, in the vehicle lamp of the related art, when the plurality of light emitting elements are turned on, dark sections (regions toward which light is not radiated) corresponding to gaps between the light emitting elements occur, and thus, irregularities in luminous intensity are generated in light distribution (a projection image) of light projected by the projection lens. Accordingly, when such a vehicle lamp is used as a headlamp or a signal lamp, safety during driving may be impaired due to degradation of visibility of a driver, misrecognition of a driving circumstance, or the like.

In order to solve the above-mentioned problems, in Published Japanese Translation No. 2006-522440 of the PCT International Publication, a vehicle lamp configured to cover a plurality of semiconductor light sources arranged on a board with a chip cover having optical transparency, wherein the chip cover is filled with an added material having light scattering or light conversion property is disclosed. Accordingly, light from the semiconductor light sources is diffused by the added material, and irregularity in luminous intensity of light distribution is suppressed.

However, in the vehicle lamp disclosed in Published Japanese Translation No. 2006-522440 of the PCT International Publication, since diffusion of light due to the added material is used, a diffusion degree of the light cannot be easily controlled. Accordingly, when such a vehicle lamp is used as an ADB, since light emitted from the semiconductor light source in a lighting state enters an optical path of the semiconductor light source in a non-lighting state, accurate light distribution control may be inhibited.

SUMMARY OF THE INVENTION

An aspect of the present invention is to provide a vehicle lamp capable of suppressing irregularity in luminous intensity of light distribution and performing more accurate light distribution control.

The present invention employs the following configuration.

(1) A vehicle lamp according to an aspect of the present invention includes a light source including a plurality of light emitting elements or light emitting surfaces; a projection lens that projects light emitted from the light source; and a light distribution adjusting element that adjusts light distribution of the light emitted from the light source, wherein the light distribution adjusting element has a plurality of prisms having different angles of inclined surfaces corresponding to a direction in which the plurality of light emitting elements or light emitting surfaces are arranged, and a prism surface in which at least one or a plurality of flat surfaces are arranged.

(2) In the aspect of (1), the plurality of prisms may include a first prism having a pair of first inclined surfaces that are inclined in opposite directions with each other at a first inclination angle, and a second prism having a pair of second inclined surfaces that are inclined in opposite directions with each other at a second inclination angle different from the first inclination angle.

(3) In the aspect of (2), the first prism, the second prism and the flat surface may be periodically or randomly disposed in parallel on the prism surface.

(4) In the aspect of (3), the first prism and the second prism may be alternately disposed in parallel on the prism surface, and the flat surface may be disposed at an apex section side and/or a bottom section side of any one of the first prism and the second prism.

(5) In the aspect of (4), the plurality of flat surfaces may include a first flat surface formed between the pair of first inclined surfaces and a second flat surface formed between the pair of second inclined surfaces.

(6) In the aspect of (4), the plurality of flat surfaces may include a first flat surface formed between one of the first inclined surface and one of the second inclined surface, which are adjacent to each other, and a second flat surface formed between the other first inclined surface and the other second inclined surface, which are adjacent to each other.

(7) In the aspect of (2), the first prism, the second prism and the flat surface may be disposed in different regions on the prism surface.

(8) In the aspect of any one of (2) to (7), a ratio of the first inclination angle and the second inclination angle may be 1:3 or 1:2.

(9) In the aspect of (8), an abundance ratio of the first inclined surface, the second inclined surface, and the flat surface in the direction in which the plurality of prisms are arranged may be 1:1:1.

(10) In the aspect of (2), the plurality of prisms may include a third prism having a pair of third inclined surfaces inclined in opposite directions with each other at a third inclination angle different from the first inclination angle and the second inclination angle.

(11) In the aspect of any one of (1) to (10), the light source may have a structure in which the plurality of light emitting elements or light emitting surfaces are disposed in parallel in a first direction and a second direction on surfaces intersecting each other, and the light distribution adjusting element may have a first prism surface corresponding to the first direction at one surface thereof and a second prism surface corresponding to the second direction at the other surface thereof, which are opposite to each other, as the prism surfaces.

(12) In the aspect of any one of (1) to (11), the projection lens may have a structure in which a first lens and a second lens are disposed in parallel, and the light distribution adjusting element may be disposed between the first lens and the second lens.

According to the aspect of the present invention, it is possible to provide a vehicle lamp capable of performing more accurate light distribution control while suppressing irregularity in luminous intensity of light distribution.

DETAILED DESCRIPTION OF THE INVENTION

Figure 1:
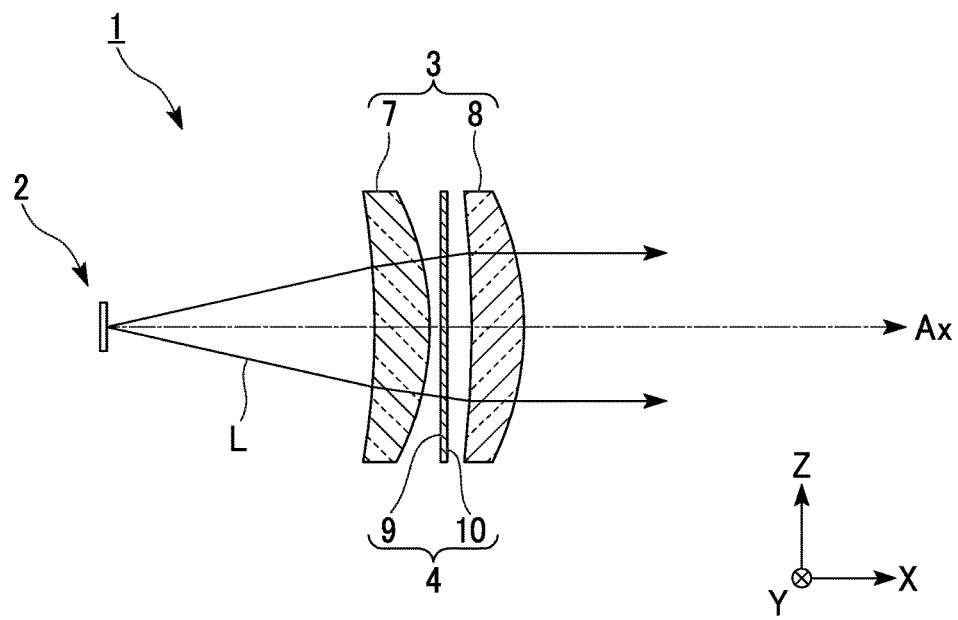
FIG. 1 is a cross-sectional view showing a configuration example of a vehicle lamp according to an embodiment of the present invention.

Hereinafter, an embodiment of the present invention will be described in detail with reference to the accompanying drawings.

Further, in the drawings used in the following description, different dimensional scales of components may be shown so that the components can be easily seen, and dimensional ratios and the like of the components need not be the same as reality. In addition, materials, dimensions, and the like exemplified in the following description are examples, and the present invention is not necessarily limited thereto, and may be appropriately modified and performed without departing from the scope of the present invention.

First, for example, a vehicle lamp 1 shown in FIG. 1 will be described as an embodiment of the present invention.

Further, FIG. 1 is a cross-sectional view showing a configuration example of the vehicle lamp 1. In addition, in the drawings shown below, an XYZ orthogonal coordinate system is set, and an X-axis direction refers to a forward/rearward direction of the vehicle lamp 1, a Y-axis direction refers to a leftward/rightward direction of the vehicle lamp 1, and a Z-axis direction refers to an upward/downward direction of the vehicle lamp 1.

The vehicle lamp 1 of the embodiment is a headlight (a headlamp) for a vehicle mounted on a front side of a vehicle, and the present invention is applied to a variable light distribution head lamp (ADB) configured to variably control light distribution of a traveling beam.

Specifically, as shown in FIG. 1, the vehicle lamp 1 generally includes a light source 2, a projection lens 3 configured to project light L emitted from the light source 2, and a light distribution adjusting element 4 configured to adjust light distribution of the light L emitted from the light source 2.

Figure 2:
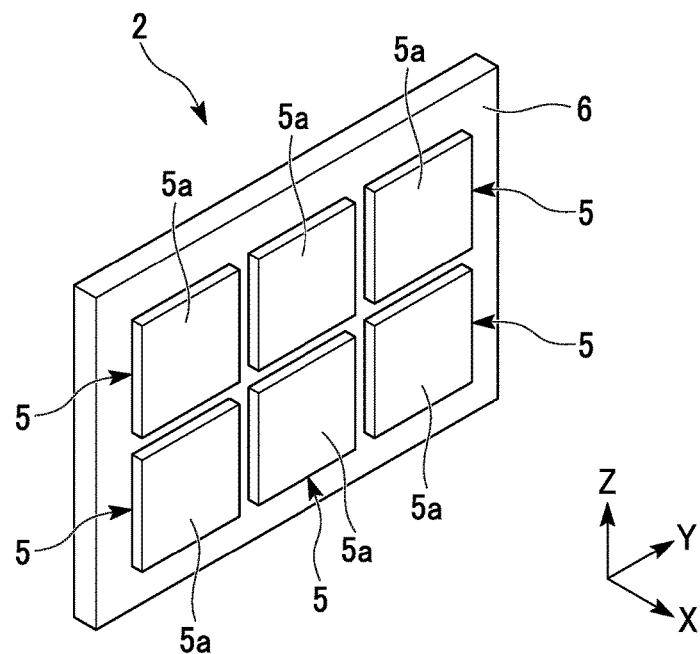
FIG. 2 is a perspective view showing an example of a light source included in the vehicle lamp shown in FIG. 1.

The light source 2 includes a plurality of light emitting elements or light emitting surfaces, and in the embodiment, for example, an LED array light source shown in FIG. 2 is used as the light source 2. Further, FIG. 2 is a perspective view showing an example of the light source 2.

Specifically, as shown in FIG. 2, the light source 2 has a structure in which a plurality of (in the example, six) LEDs serving as light emitting elements 5 are mounted on a surface of a circuit board 6. The plurality of light emitting elements 5 are disposed in parallel in a matrix in the leftward/rightward direction (a first direction) and the upward/downward direction (a second direction), which are perpendicular to each other, on a surface of the circuit board 6.

In the embodiment, each of light emitting surfaces 5a of the light emitting elements 5 has a square shape, and in a state in which the light emitting surfaces 5a of the light emitting elements 5 are directed forward (a+X-axis direction), three of the light emitting elements 5 are disposed in parallel in the leftward/rightward direction (the Y-axis direction) and two of the light emitting elements 5 are disposed in parallel in the upward/downward direction (the Z-axis direction) at equal intervals. In the light source 2, as the light emitting elements 5 are switched on, light distribution of the light L emitted from the light source 2 can be variably controlled.

As shown in FIG. 1, the projection lens 3 has a first lens 7 and a second lens 8 which are disposed in front of the light source 2. The first lens 7 and the second lens 8 are disposed in parallel to the forward/rearward direction (the X-axis direction) in a state in which optical centers thereof coincide with an optical axis Ax of the light L emitted from the light source 2.

In the embodiment, convex lenses which each have a concave rear surface and a convex front surface are used as the first lens 7 and the second lens 8. The projection lens 3 is constituted by compound lenses including two convex lenses, and is disposed such that a center of the light source 2 coincides with a synthesized focus of a rear surface side. Accordingly, the light L emitted from the light source 2 (the plurality of light emitting elements 5) can be enlarged and projected forward (in the +X-axis direction) by the projection lens 3.

The light distribution adjusting element 4 is disposed between the first lens 7 and the second lens 8. In addition, the light distribution adjusting element 4 is disposed in a state in which an optical center thereof coincides with the optical axis Ax of the light L emitted from the light source 2.

Figure 3:
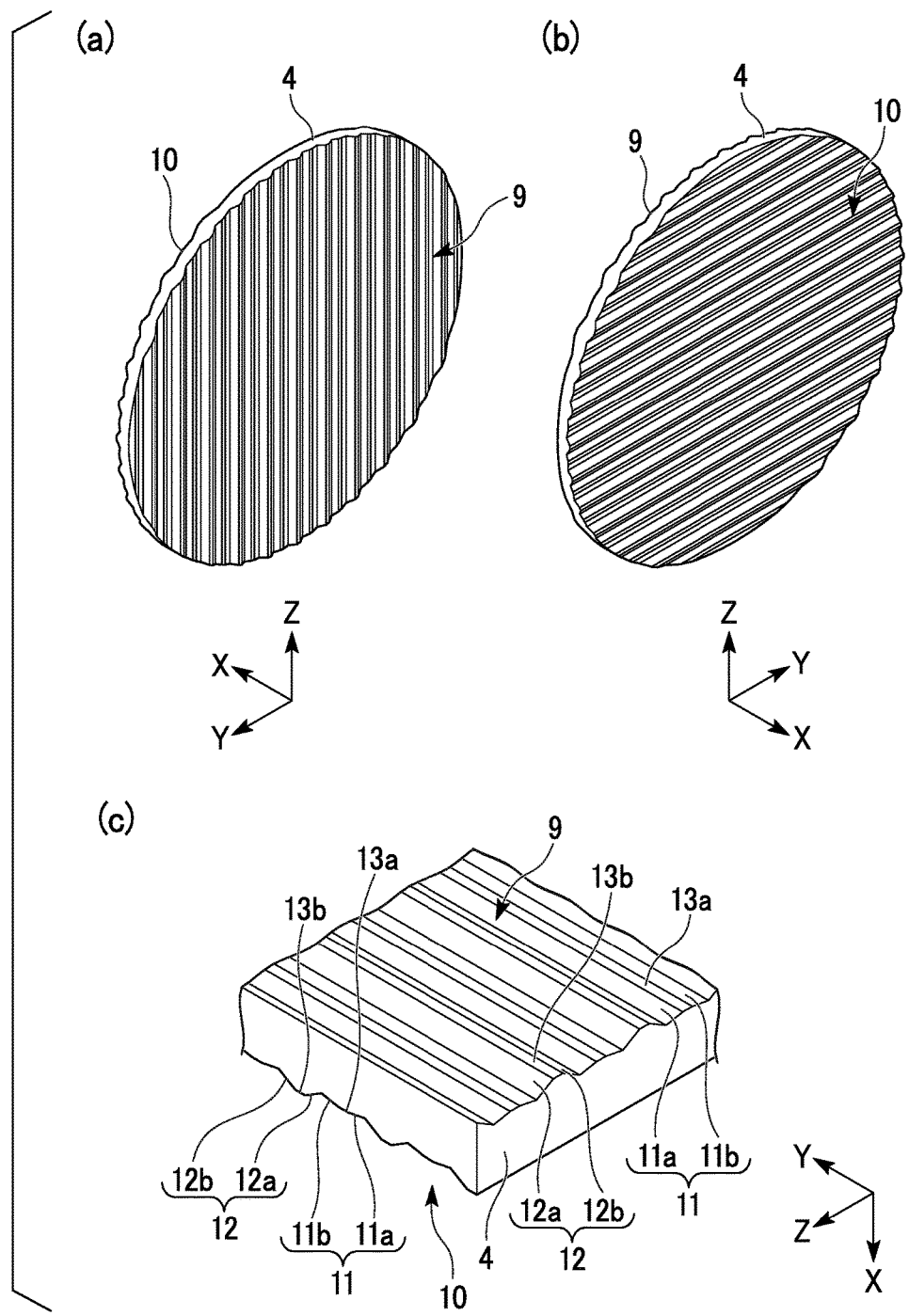
FIG. 3 shows a light distribution adjusting element included in the vehicle lamp shown in FIG. 1, wherein part (a) is a perspective view seen from a front surface side thereof, part (b) is a perspective view seen from a rear surface side thereof, and part (c) is a perspective cross-sectional view showing a portion thereof that is cut out.

As shown in parts (a) to (c) of FIG. 3, the light distribution adjusting element 4 has a disk shape corresponding to the projection lens 3. The light distribution adjusting element 4 has a first prism surface 9 on one surface (a front surface) thereof and a second prism surface 10 on the other surface (a rear surface) which are opposite to each other. Further, part (a) of FIG. 3 is a perspective view showing the light distribution adjusting element 4 from the rear surface side. Part (b) of FIG. 3 is a perspective view showing the light distribution adjusting element 4 from a front surface side. Part (c) of FIG. 3 is a perspective cross-sectional view showing the light distribution adjusting element 4 of which a portion is cut out.

Among the prism surfaces, as shown in part (a) of FIG. 3, the first prism surface 9 constitutes a prism surface corresponding to the leftward/rightward direction (the first direction) in which the plurality of light emitting elements 5 are arranged and is configured to adjust light distribution of the light L emitted from the light source 2 in the leftward/rightward direction. Meanwhile, as shown in part (b) of FIG. 3, the second prism surface 10 constitutes a prism surface corresponding to the upward/downward direction (the second direction) in which the plurality of light emitting elements 5 are arranged and is configured to adjust light distribution of the light L emitted from the light source 2 in the upward/downward direction.

Figure 4:
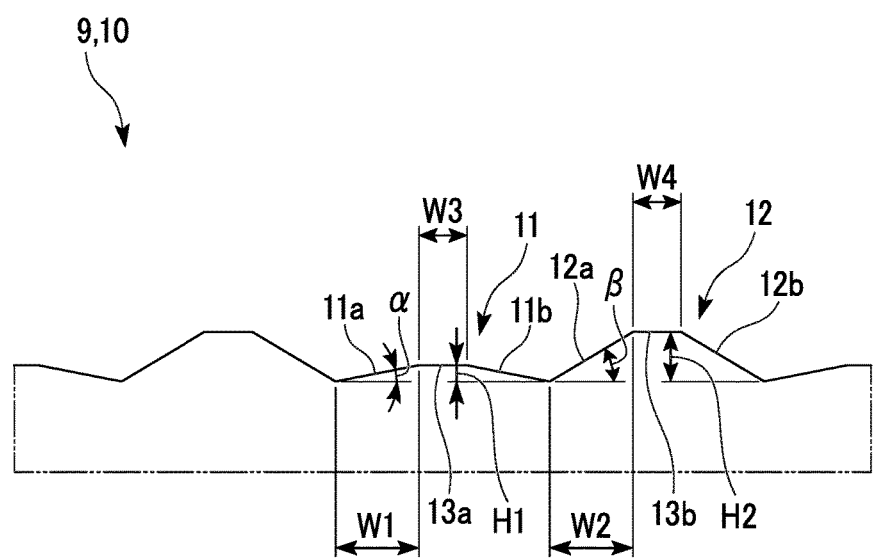
FIG. 4 is a cross-sectional view showing a structure of a first prism surface and a second prism surface.

In addition, as shown in part (c) of FIG. 3, the first prism surface 9 and the second prism surface 10 have the same configuration except for a positional relation in which they are perpendicular to each other on a surface perpendicular to the optical axis Ax. Accordingly, specific structures of the first prism surface 9 and the second prism surface 10 will be shown together in FIG. 4. Further, FIG. 4 is a cross-sectional view showing the structure of the first prism surface 9 and the second prism surface 10. In addition, an XYZ orthogonal coordinate system of the first prism surface 9 is shown at a right side of FIG. 4, and an XYZ orthogonal coordinate system of the second prism surface 10 is shown at a left side of FIG. 4.

As shown in FIG. 4 and part (a) of FIG. 3, the first prism surface 9 has a structure in which a first prism 11 and a second prism 12 are disposed in parallel to the leftward/rightward direction (the Y-axis direction). The first prism 11 has a pair of first inclined surfaces 11a and 11b inclined in opposite directions with each other at a first inclination angle α with respect to the surface perpendicular to the optical axis Ax, and is formed to extend in the upward/downward direction (the Z-axis direction). The second prism 12 has a pair of second inclined surfaces 12a and 12b inclined in opposite directions with each other at a second inclination angle β (>α) different from the first inclination angle α, and is formed to extend in the upward/downward direction (the Z-axis direction).

In addition, the first prism surface 9 has a first flat surface 13a between the pair of first inclined surfaces 11a and 11b and a second flat surface 13b between the pair of second inclined surfaces 12a and 12b. The first flat surface 13a is formed to cut an apex section between the first inclined surfaces 11a and 11b. The second flat surface 13b is formed to cut an apex section between the second inclined surfaces 12a and 12b. In addition, the first flat surface 13a and the second flat surface 13b are formed to extend in the upward/downward direction (the Z-axis direction) with a constant width to be parallel to the surface perpendicular to the optical axis Ax.

As shown in FIG. 4 and part (b) of FIG. 3, the second prism surface 10 has a structure in which the first prism 11 and the second prism 12 are alternately disposed in parallel to the upward/downward direction (the Z-axis direction). The first prism 11 has the pair of first inclined surfaces 11a and 11b inclined in opposite directions with each other at the first inclination angle α with respect to the surface perpendicular to the optical axis Ax and is formed to extend in the leftward/rightward direction (the Y-axis direction). The second prism 12 has the pair of second inclined surfaces 12a and 12b inclined in opposite directions with each other at the second inclination angle β (>α) different from the first inclination angle α and is formed to extend in the leftward/rightward direction (the Y-axis direction).

In addition, the second prism surface 10 has the first flat surface 13a between the pair of first inclined surfaces 11a and 11b and the second flat surface 13b between the pair of second inclined surfaces 12a and 12b. The first flat surface 13a is formed to cut the apex section between the first inclined surfaces 11a and 11b. The second flat surface 13b is formed to cut the apex section between the second inclined surfaces 12a and 12b. In addition, the first flat surface 13a and the second flat surface 13b are formed to extend in the leftward/rightward direction (the Y-axis direction) with the constant width to be parallel to the surface perpendicular to the optical axis Ax.

In the first prism surface 9 and the second prism surface 10, a ratio between the first inclination angle α and the second inclination angle β is preferably in a range of 1:3 or 1:2. Further, a ratio of a width W1 of the first inclined surfaces 11a and 11b, a width W2 of the second inclined surfaces 12a and 12b, and a sum of a width W3 of the first flat surface 13a and a width W4 of the second flat surface 13b (W3+W4), is preferably 1:1:1 in a direction in which the first prism 11 and the second prism 12 are arranged.

That is, in the first prism surface 9 and the second prism surface 10, an abundance ratio of the first inclined surfaces 11a and 11b, the second inclined surfaces 12a and 12b, and the first flat surface 13a and the second flat surface 13b, is preferably 1:1:1 in the direction in which the first prism 11 and the second prism 12 are arranged.

In addition, in the first prism surface 9 and the second prism surface 10, a ratio of the width W3 of the first flat surface 13a and the width W4 of the second flat surface 13b is preferably in a range of 1:1 to 1:3. When the ratio of the width W3 of the first flat surface 13a and the width W4 of the second flat surface 13b is 1:1, a ratio of a height H1 of the first flat surface 13a and a height H2 of the second flat surface 13b is 1:3. Meanwhile, when the ratio of the width W3 of the first flat surface 13a and the width W4 of the second flat surface 13b is 1:3, the ratio of the height H1 of the first flat surface 13a and the height H2 of the second flat surface 13b is 1:1.

Further, in the embodiment, a ratio of the first inclination angle α and the second inclination angle β is 1:3, and further, the ratio of the width W1 of the first inclined surfaces 11a and 11b, the width W2 of the second inclined surfaces 12a and 12b, and the sum of the width W3 of the first flat surface 13a and the width W4 of the second flat surface 13b (W3+W4) is 1:1:1 in the direction in which the first prism 11 and the second prism 12 are arranged. In addition, the ratio of the width W3 of the first flat surface 13a and the width W4 of the second flat surface 13b is 1:1.

Further, the light source 2 is ideally a so-called top hat shape in which there is no difference in a luminous intensity distribution of light emitted from the light emitting elements 5 between a center and both ends thereof. However, since such an implementation has the luminous intensity distribution whose a center is higher than both ends, the inclination angles α and β of the prisms 11 and 12, the widths W1 and W2 of the inclined surfaces 11a, 11b, 12a and 12b, the widths W3 and W4 of the flat surfaces 13a and 13b, and the like described above, may be appropriately adjusted and are not necessarily limited to the ratios of the above-mentioned parts in consideration of the luminous intensity distribution of the light emitted from the light emitting elements 5, the interval between the light emitting elements 5, or the like.

In the vehicle lamp 1 having the above-mentioned configuration, light distribution of the light L emitted from the light source 2 in the leftward/rightward direction (the Y-axis direction) is adjusted by the first prism surface 9 of the light distribution adjusting element 4, and light distribution of the light L emitted from the light source 2 in the upward/downward direction (the Z-axis direction) is adjusted by the second prism surface 10 of the light distribution adjusting element 4. Then, the light L, which has had its light distribution adjusted is enlarged and projected in a vehicle traveling direction (the +X-axis direction) by the projection lens 3.

Figure 5:
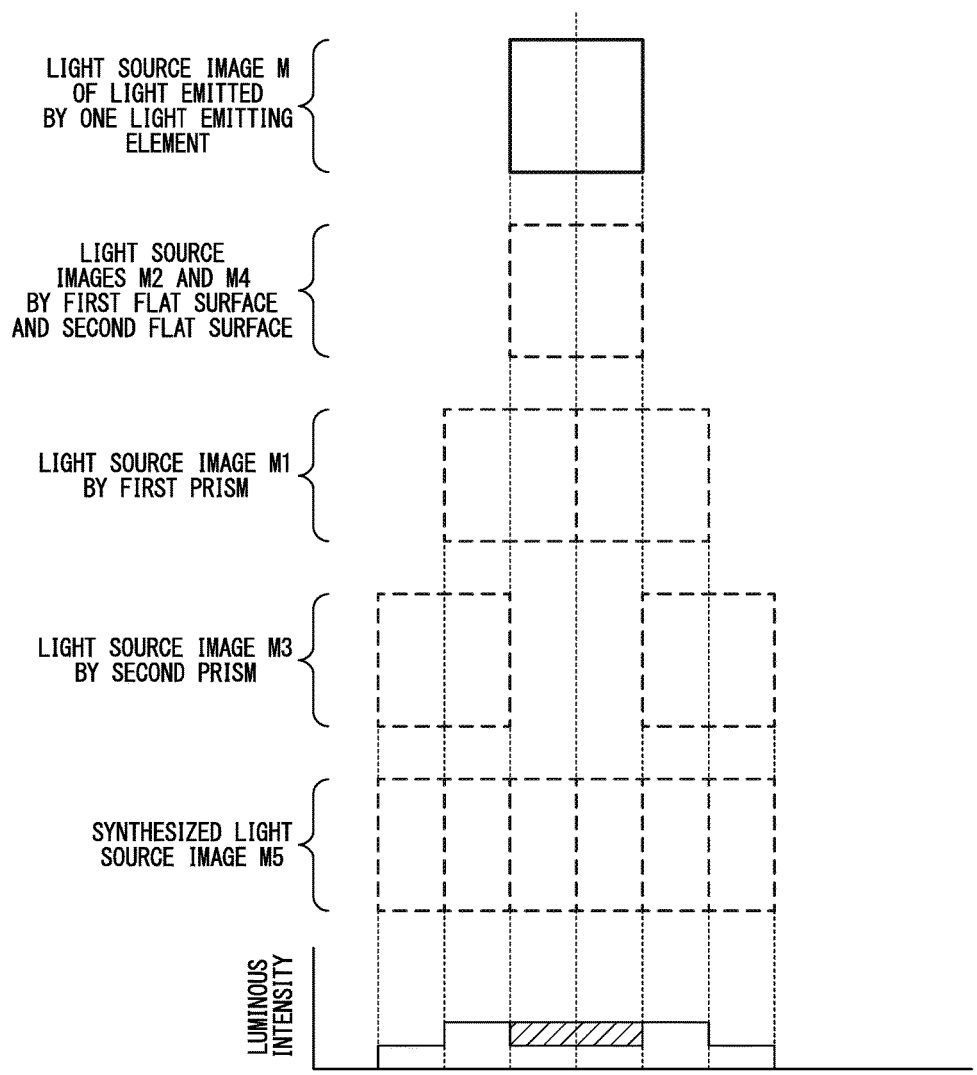
FIG. 5 is a view for describing a light source image and a luminous intensity distribution thereof when distribution of light emitted from one light emitting element is adjusted by a light distribution adjusting element.
Figure 6:
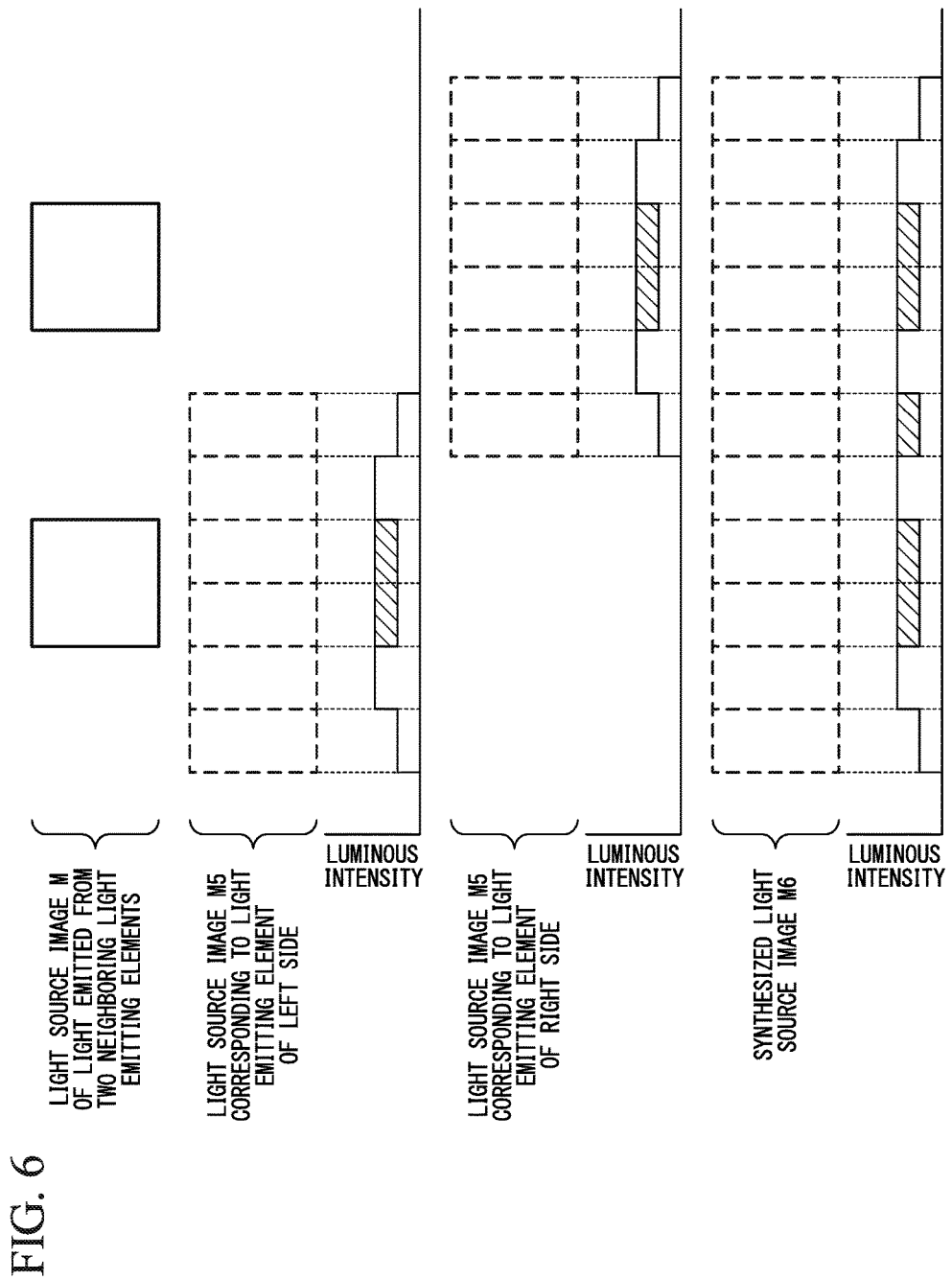
FIG. 6 is a view for describing light source images and luminous intensity distributions thereof when distributions of light emitted from two neighboring light emitting elements are adjusted by a light distribution adjusting element.

Here, light distribution adjustment of light by the light distribution adjusting element 4 will be described with reference to FIGS. 5 and 6. Further, FIG. 5 is a view for describing a light source image and a luminous intensity distribution thereof when light distribution of light emitted from one of the light emitting elements 5 is adjusted by the light distribution adjusting element 4. FIG. 6 is a view for describing light source images and luminous intensity distributions thereof when light distributions of light emitted from two neighboring light emitting elements 5 are adjusted by the light distribution adjusting element 4.

In addition, in the following description, since the first prism surface 9 and the second prism surface 10 perform the same light distribution adjustment except for a difference in the direction in which the above-mentioned light distribution is, light distribution adjustment of the light L by the prism surfaces 9 and 10 will be described together.

The light distribution adjusting element 4 of the embodiment has a function of expanding a light source image of the light L emitted from the light emitting elements 5 in the directions in which the light emitting elements 5 are arranged (the leftward/rightward direction and the upward/downward direction) while refracting the light L entering the prism surfaces 9 and 10 using the first prism 11 and the second prism 12 as the light L emitted from the plurality of light emitting elements 5 enters the prism surfaces 9 and 10.

Specifically, as shown in FIG. 5, a light source image M of light emitted from one light emitting element 5 has a square shape corresponding to the light emitting surface 5a thereof. In this case, among light entering the prism surfaces 9 and 10, the light entering the first prism 11 is divided into two parts to form light source images M1 at positions shifted from each other by a distance corresponding to the first inclination angle α while being refracted in opposite directions by the pair of first inclined surfaces 11a and 11b. In addition, light entering the first flat surface 13a forms a light source image M2 disposed between two light source images M1.

Meanwhile, light entering the second prism 12 is divided into two parts to form light source images M3 at positions shifted from each other by a distance corresponding to the second inclination angle β while being refracted in opposite directions with each other by the pair of second inclined surfaces 12a and 12b. In addition, light entering the second flat surface 13b forms a light source image M4 disposed between two light source images M3.

Accordingly, light emitted from the prism surfaces 9 and 10 forms a light source image M5 expanded in the directions (the leftward/rightward direction and the upward/downward direction) in which the light emitting elements 5 are arranged instead of the light source image M before entering the prism surfaces 9 and 10 by overlapping (synthesizing)

the light source images M1 to M4. In addition, luminous intensity distribution of the light source image M5 is shown in the graph of FIG. 5.

Figure 7:
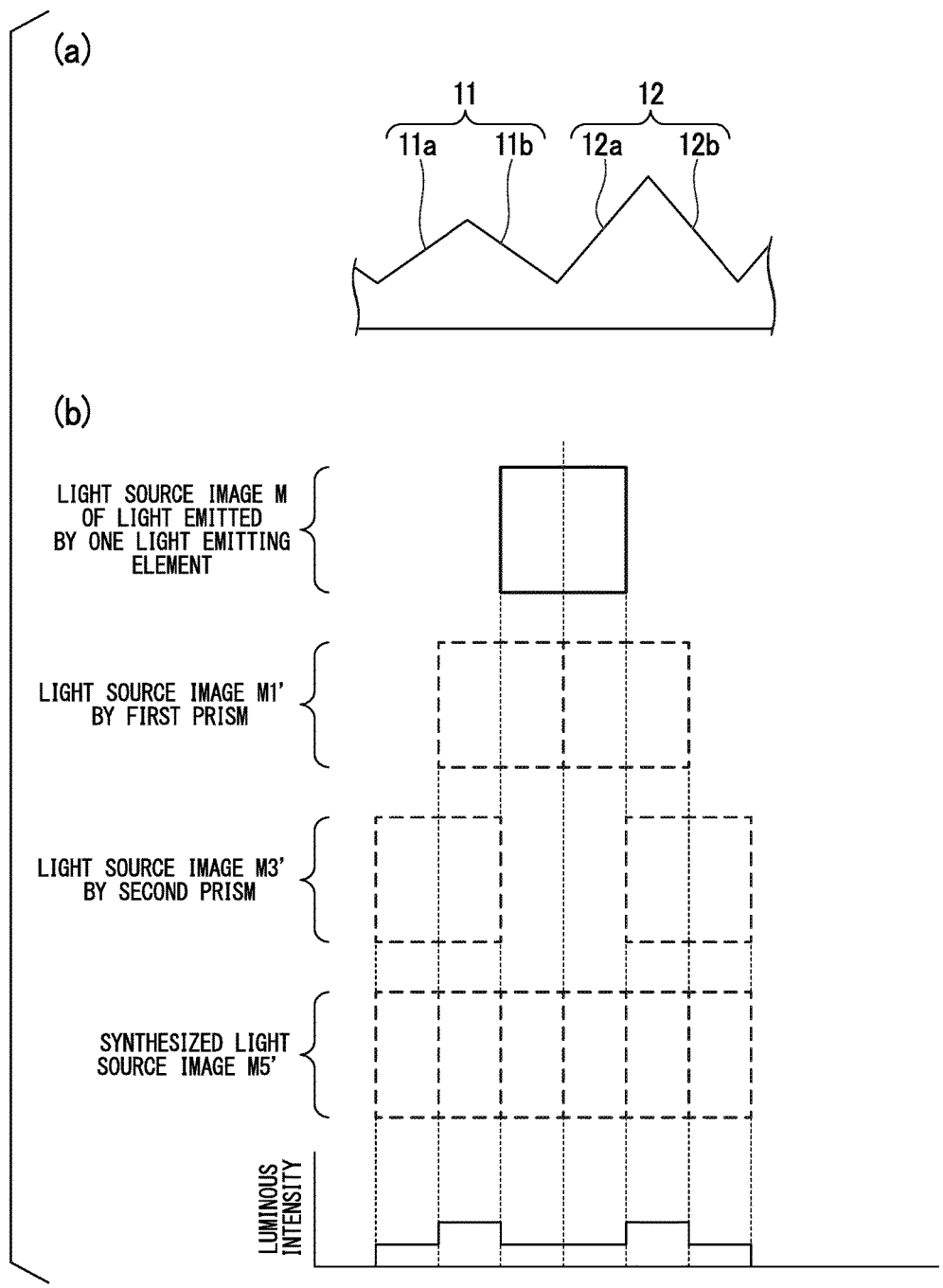
FIG. 7 shows a prism surface that is a reference example, wherein part (a) is a cross-sectional view showing a configuration of the prism surface and part (b) is a view for describing a light source image by the prism surface and a luminous intensity distribution thereof.

Here, a prism surface serving as a reference example, a light source image by the prism surface and a luminous intensity distribution thereof are shown in parts (a) and (b) of FIG. 7. Further, part (a) of FIG. 7 is a cross-sectional view showing a configuration of the prism surface serving as the reference example. Part (b) of FIG. 7 is a view for describing a light source image by the prism surface serving as the reference example and a luminous intensity distribution thereof.

The prism surface shown in part (a) of FIG. 7 has a configuration similar to the prism surfaces 9 and 10 except that the first flat surface 13a and the second flat surface 13b are omitted. In the case of the configuration, as shown in part (b) of FIG. 7, light entering the first prism 11 is divided into two parts to form a light source image M1' at a position shifted from each other by a distance corresponding to the first inclination angle α while being refracted in opposite directions with each other by the pair of first inclined surfaces 13a and 13b.

Meanwhile, light entering the second prism 12 is divided into two parts to form a light source image M3' at positions shifted from each other by a distance corresponding to the second inclination angle β while being refracted in opposite directions with each other by the pair of second inclined surfaces 12a and 12b.

Accordingly, the light emitted from the prism surface shown in part (a) of FIG. 7 forms a light source image M5' by overlapping (synthesizing) the light source images M1' and M3'. In addition, luminous intensity distribution of the light source image M5' is shown in the graph of FIG. 7.

In the luminous intensity distribution of the light source image M5' shown in part (b) of FIG. 7, a decrease in the luminous intensity occurs between the light source image M1' by the first prism 11 and the light source image M3' by the second prism 12. Conversely, in the luminous intensity distribution of the light source image M5 shown in FIG. 5, the luminous intensity is uniformized as the light source images M2 and M4 are overlapped by the first flat surface 13a and the second flat surface 13b between the light source image M1 created by the first prism 11 and the light source image M3 created by the second prism 12.

Next, as shown in FIG. 6, light source images M of the light emitted from the two neighboring light emitting elements 5 are formed with a gap therebetween. In this case, the light emitted from the prism surfaces 9 and 10 forms a light source image M6 by overlapping (synthesizing) the light source images M5 corresponding to the neighboring light emitting elements 5. In addition, a luminous intensity distribution of the light source image M6 is shown in the graph of FIG. 6.

In the luminous intensity distribution of the light source image M6 shown in FIG. 6, as the light source images M5 corresponding to the neighboring light emitting elements 5 are overlapped, a dark section (a region toward which light is not radiated) corresponding to the gap between the neighboring light emitting elements 5 is eliminated, and the luminous intensity is uniformized.

Figure 8:
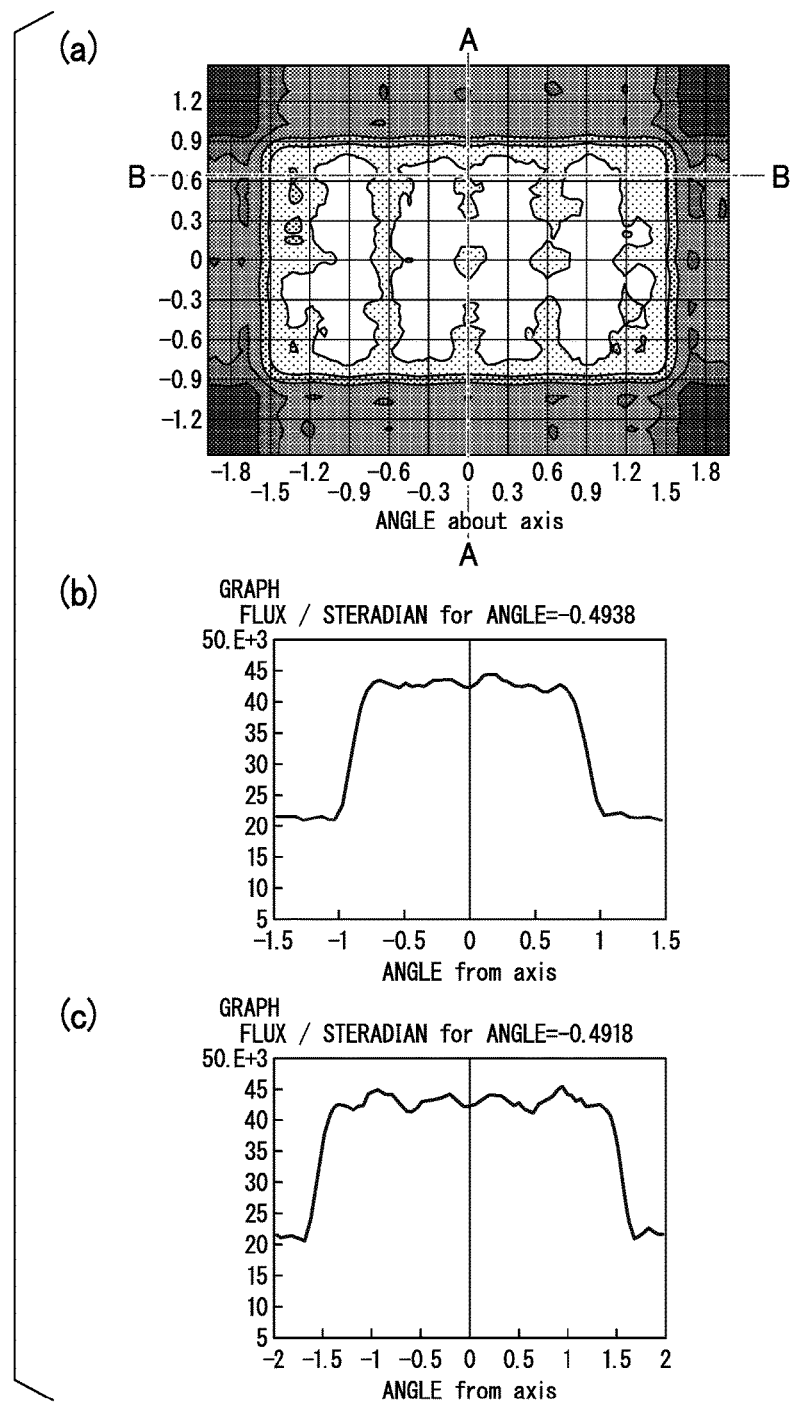
FIG. 8 is a view for describing a projection image by the vehicle lamp of the embodiment, wherein part (a) is an in-plane luminous intensity distribution view showing the projection image, part (b) is a cross-section luminous intensity distribution view in an upward/downward direction of the projection image corresponding to line segment A-A shown in part (a), and part (c) is a cross-section luminous intensity distribution view in a leftward/rightward direction of the projection image corresponding to line segment B-B shown in part (a).

Next, in the vehicle lamp 1 of the embodiment, a simulation result of a projection image (a light distribution pattern) when the light L radiated toward a forward side of the projection lens 3 is projected to a virtual vertical screen opposing the projection lens 3 is shown in parts (a) to (c) of FIG. 8.

Further, part (a) of FIG. 8 is an in-plane luminous intensity distribution view showing a projection image formed on a surface of the virtual vertical screen. Part (b) of FIG. 8 is a cross section luminous intensity distribution view of the projection image in the upward/downward direction corresponding to line segment A-A shown in part (a) of FIG. 8. Part (c) of FIG. 8 is a cross-section luminous intensity distribution view of the projection image in the leftward/rightward direction corresponding to line segment B-B shown in part (a) of FIG. 8.

In addition, the virtual vertical screen is disposed at the forward side spaced about 25 m from a front surface (a light emission surface) of the second lens 8. Further, the projection lens 3 has a synthesized focus of an image side at the forward side spaced about 25 m from the front surface (the light emission surface) of the second lens 8.

In the embodiment, a white LED chip configured to emit white light of 200 lm at a size of about 0.6 mm×0.6 mm is used as the light emitting elements 5. In addition, an interval between the neighboring light emitting elements 5 in the leftward/rightward direction and the upward/downward direction is about 0.9 mm.

Figure 9:
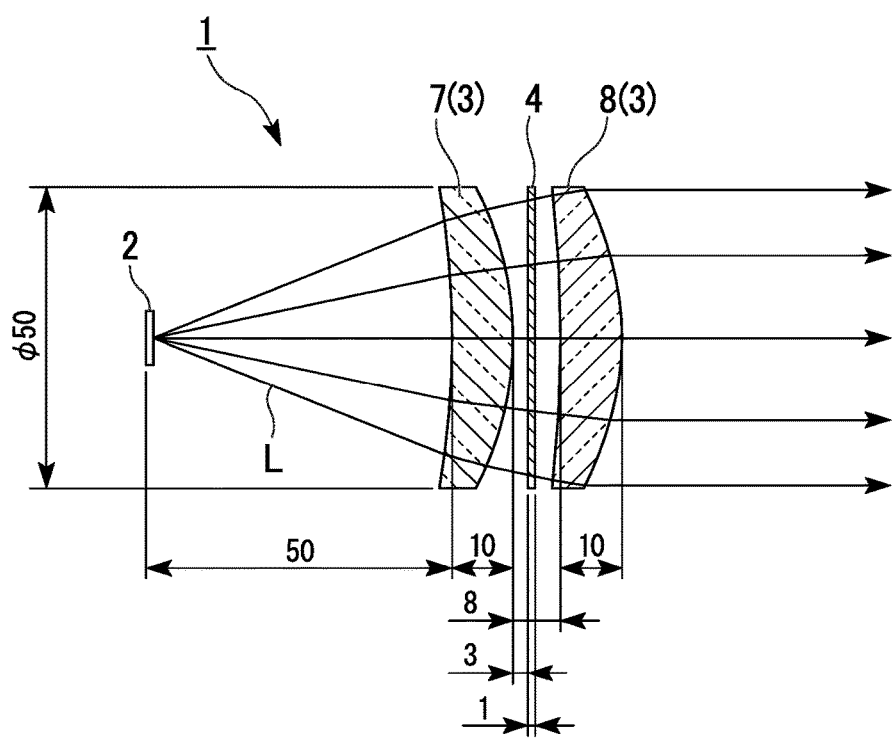
FIG. 9 is a cross-sectional view showing dimensions of parts of the vehicle lamp.

In addition, in the embodiment, as shown in FIG. 9, dimensions (unit: mm) of each of the parts of the vehicle lamp 1 are set. Further, FIG. 9 is a cross-sectional view showing dimensions of each of the parts of the vehicle lamp 1. In addition, the first lens 7 and the second lens 8 are convex lens having a refractive index n of 1.5168 and specifications shown in the following table 1. In addition, the light distribution adjusting element 4 has the first prism surface 9 and the second prism surface 10 having a refractive index n of 1.4918 and specifications shown in the following table 2.

TABLE 1

|  | Curvature | Aspherical Surface Coefficient |
|---|---|---|
| First Lens |  |  |
| Rear Surface | −180 | 9 |
| Front Surface | −50 | −1 |
| Second Lens |  |  |
| Rear Surface | −350 | 12 |
| Front Surface | −53 | 0 |

TABLE 2

| First Prism Surface/Second Prism Surface | |
|---|---|
| α | 5.65° |
| β | 16.96° |
| W2, W4 | 240 μm |
| W1, W3 | 500 μm |
| α:β | 1:3 |
| W1:W2:W3 + W4 | 1:1:1 |

Figure 10:
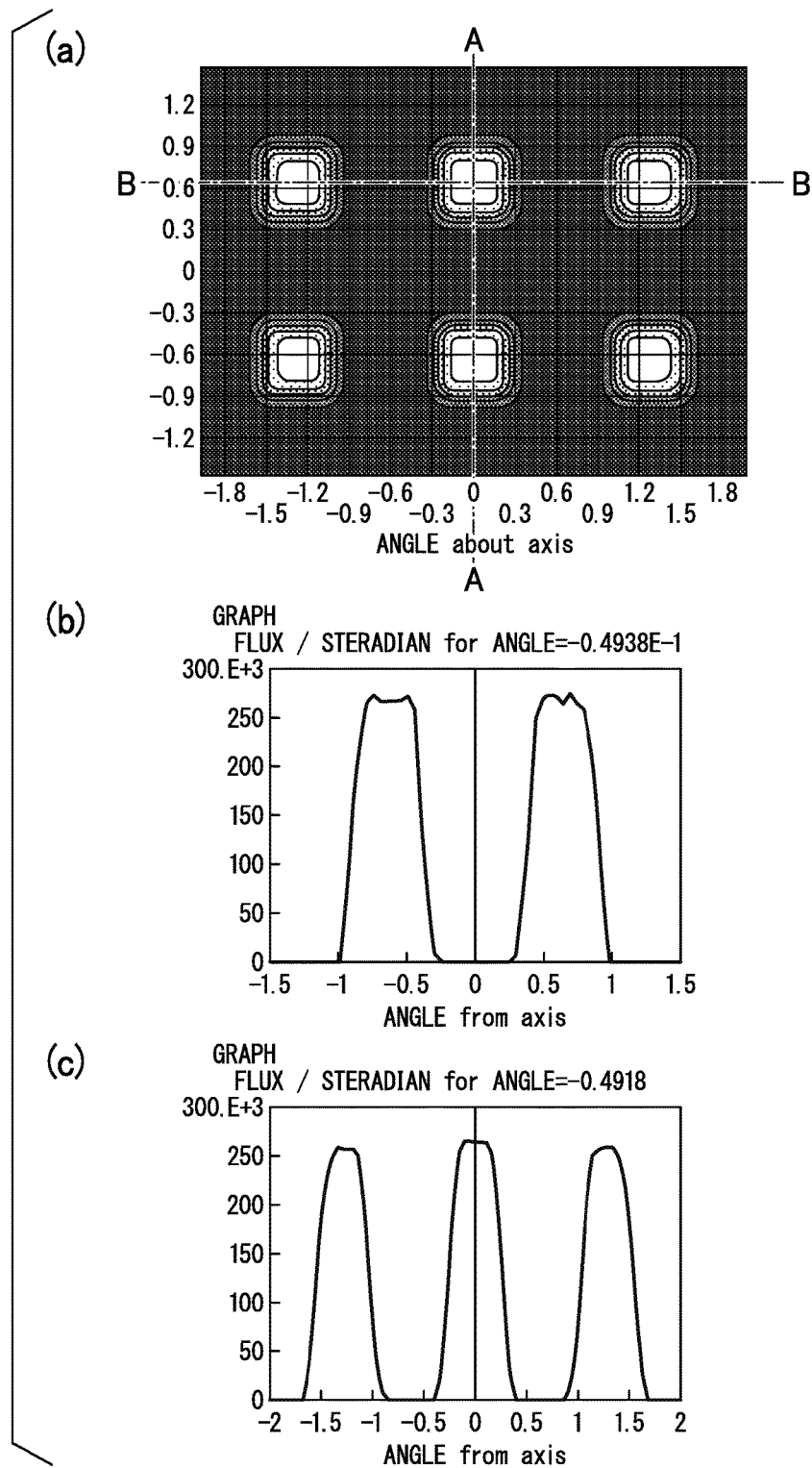
FIG. 10 is a view for describing a projection image by a vehicle lamp of a comparative example, wherein part (a) is an in-plane luminous intensity distribution view showing the projection image, part (b) is a cross-section luminous intensity distribution view in the upward/downward direction of the projection image corresponding to line segment A-A shown in part (a), and part (c) is a cross-section luminous intensity distribution view in the leftward/rightward direction of the projection image corresponding to line segment B-B shown in part (a).

Meanwhile, as a comparative example, in a vehicle lamp in which the light distribution adjusting element 4 is omitted from the configuration of the vehicle lamp 1, a simulation result of a projection image (a light distribution pattern) when the light L radiated toward the forward side of the projection lens 3 is projected is shown in parts (a) to (c) of FIG. 10. Further, parts (a) to (c) of FIG. 10 are shown in the same ways as parts (a) to (c) of FIG. 8.

In the vehicle lamp of the comparative example, as shown in parts (a) to (c) of FIG. 10, it is understood that, since a dark section (a region toward which light is not radiated)

corresponding to a gap between the light emitting elements 5 is generated between the light source images corresponding to the light emitting elements 5, irregularity in luminous intensity occurs in light distribution (a projection image) of light projected by the projection lens 3.

Conversely, in the vehicle lamp 1 of the embodiment, as shown in parts (a) to (c) of FIG. 8, it is understood that a dark section (a region toward which light is not radiated) corresponding to a gap between the light emitting elements 5 is eliminated, and luminous intensity in the leftward/rightward direction and the upward/downward direction is further uniformized.

As described above, in the vehicle lamp 1 of the embodiment, the first prism surface 9 and the second prism surface 10 of the light distribution adjusting element 4 can suppress the generation of irregularity in luminous intensity when the plurality of light emitting elements 5 are disposed in parallel by expanding the light source image of the light L emitted from the light emitting elements 5 in the directions (the leftward/rightward direction and the upward/downward direction) in which the light emitting elements 5 are arranged.

In addition, in the vehicle lamp 1 of the embodiment, as various parameters (a width, an angle (a shift amount), a ratio thereof, and the like) of the first prism surface 9 and the second prism surface 10 that constitute the light distribution adjusting element 4 are adjusted, more accurate light distribution control can be performed.

In particular, when the ratio of the first inclination angle α and the second inclination angle β is 1:3, and further, when the ratio of the width W1 of the first inclined surfaces 11a and 11b, the width W2 of the second inclined surfaces 12a and 12b, and the sum of the width W3 of the first flat surface 13a and the width W4 of the second flat surface 13b (W3+W4) is 1:1:1 in the direction in which the first prism 11 and the second prism 12 are arranged, a dark section (a region toward which light is not radiated) corresponding to the gap between the light emitting elements 5 is eliminated, and light distribution of the light can be more uniformized.

Further, in the embodiment, the ratio of the first inclination angle α and the second inclination angle β or the ratio of the width W1 of the first inclined surfaces 11a and 11b, the width W2 of the second inclined surfaces 12a and 12b, and the sum of the width W3 of the first flat surface 13a and the width W4 of the second flat surface 13b (W3+W4) described above is not necessarily limited, and may be appropriately varied. Accordingly, light distribution of the light can also be varied in addition to uniformizing the light distribution of the light.

In addition, the widths W3 and W4 of the first flat surface 13a and the second flat surface 13b can be appropriately adjusted according to the ratio of the first inclination angle α and the second inclination angle β or the ratio of the width W1 of the first inclined surfaces 11a and 11b and the width W2 of the second inclined surfaces 12a and 12b. Further, the widths W3 and W4 can also be appropriately adjusted by a diffusion degree of the light emitted from the light emitting elements 5, a size of the gap between the light emitting elements 5, or the like. Accordingly, a degree (a luminous intensity) of overlap of the light source images M2 and M4 created by the first flat surface 13a and the second flat surface 13b can be adjusted between the light source image M1 by the first prism 11 and the light source image M3 by the second prism 12.

Further, the present invention is not necessarily limited to the above-mentioned embodiment and various modifications may be made without departing from the scope of the present invention. In addition, in the following description, the same parts as the vehicle lamp 1 are designated by the same reference numerals in the drawings, and descriptions thereof will be omitted.

Figure 11:
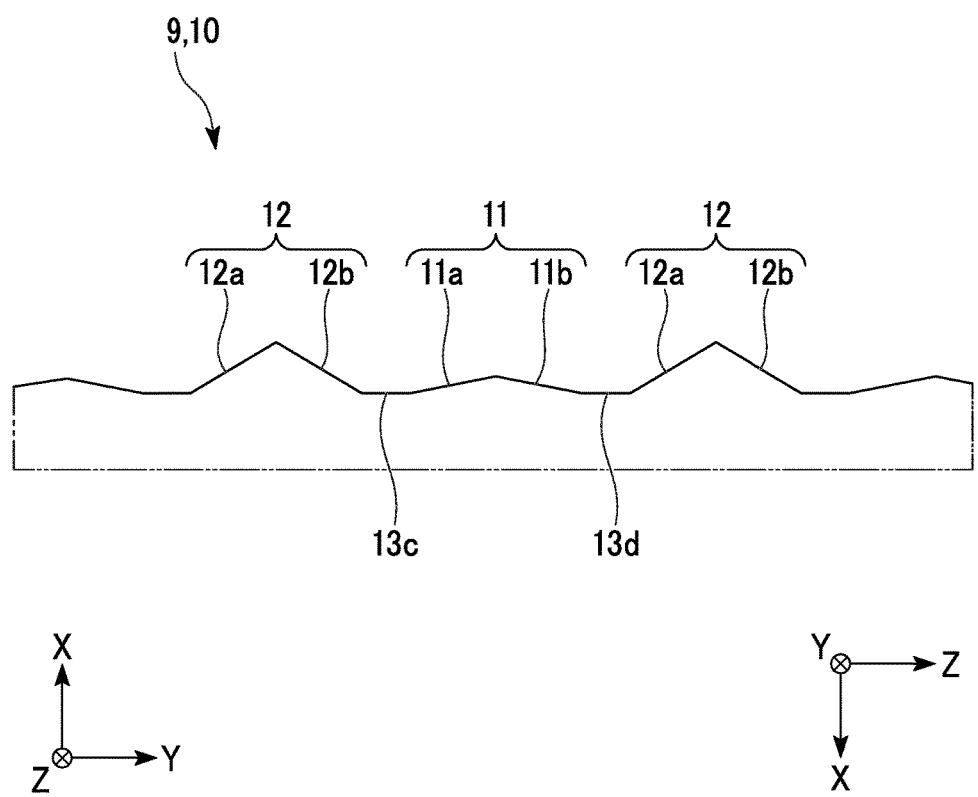
FIG. 11 is a cross-sectional view showing another structure of a first prism surface and a second prism surface.

Specifically, in the vehicle lamp 1 of the embodiment, for example, as shown in FIG. 11, a structure of the first prism surface 9 and the second prism surface 10 included in the light distribution adjusting element 4 can be varied. Further, FIG. 11 is a cross-sectional view showing another structure of the first prism surface 9 and the second prism surface 10. In addition, an XYZ orthogonal coordinate system of the first prism surface 9 is shown at a right side of FIG. 11 and an XYZ orthogonal coordinate system of the second prism surface 10 is shown at a left side of FIG. 11.

In the configuration shown in FIG. 11, in the configuration of the prism surfaces 9 and 10, instead of the first flat surface 13a and the second flat surface 13b, a first flat surface 13c is provided between the first inclined surface 11a and the second inclined surface 12b which are adjacent to each other, and a second flat surface 13d is provided between the second inclined surface 12a and the first inclined surface 11b which are adjacent to each other.

That is, the first flat surface 13c is formed to cut a bottom section between the first inclined surface 11a and the second inclined surface 12b. The second flat surface 13d is formed to cut a bottom section between the second inclined surface 12a and the first inclined surface 11b.

Even in the case of the configuration, like the case shown in FIG. 4, as the light L emitted from the plurality of light emitting elements 5 enters the prism surfaces 9 and 10, a light source image of the light L emitted from the light emitting elements 5 can expand in the directions (the leftward/rightward direction and the upward/downward direction) in which the light emitting elements 5 are arranged while refracting the light L entering the prism surfaces 9 and 10. In addition, a dark section (a region toward which light is not radiated) corresponding to a gap between the light emitting elements 5 is eliminated, and luminous intensities in the leftward/rightward direction and the upward/downward direction can be uniformized. Accordingly, also in the case of the configuration, more accurate light distribution control can be performed while suppressing the occurrence of irregularity in luminous intensity when the plurality of light emitting elements 5 are disposed in parallel.

In addition, the prism surfaces 9 and 10 are not necessarily limited to the configuration in which the first flat surface 13a and the second flat surface 13b are disposed at apex section sides of both the first prism 11 and the second prism 12 as shown in FIG. 4 and to the configuration in which the first flat surface 13c and the second flat surface 13d are disposed at bottom section sides of both the first prism 11 and the second prism 12 as shown in FIG. 11.

Figure 12:
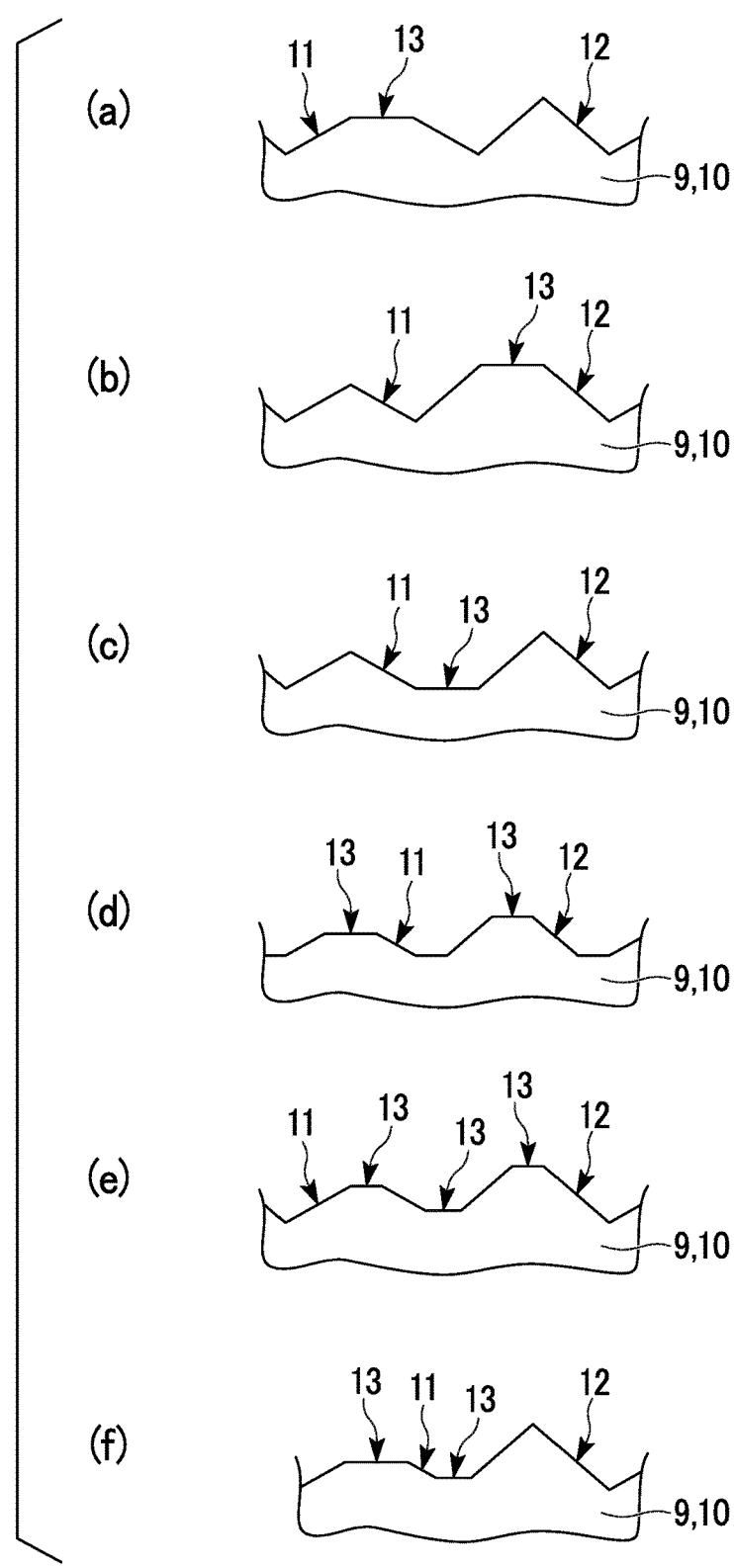
FIG. 12 is a cross-sectional view showing another configuration example of the prism surface.

That is, in the prism surfaces 9 and 10, for example, a configuration in which the flat surface 13 is disposed at an apex section side or a bottom section side of any one of the first prism 11 and the second prism 12 as shown in parts (a) to (c) of FIG. 12, or a configuration in which the flat surface 13 is disposed at an apex section side and a bottom section side of any one of the first prism 11 and the second prism 12 as shown in parts (d) to (f) of FIG. 12 may be assumed.

In addition, the prism surfaces 9 and 10 are not necessarily limited to the configuration in which the first prism 11 (the first inclined surfaces 11a and 11b), the second prism 12 (the second inclined surfaces 12a and 12b), and the flat surface 13 (the first flat surfaces 13a and 13c and the second flat surfaces 13b and 13d) are alternatively disposed in parallel to each other. That is, in the prism surfaces 9 and 10, a configuration in which the first prism 11, the second prism 12, and the flat surface 13 are periodically or randomly arranged may be provided, or the arrangement sequence may be appropriately varied.

Figure 13:
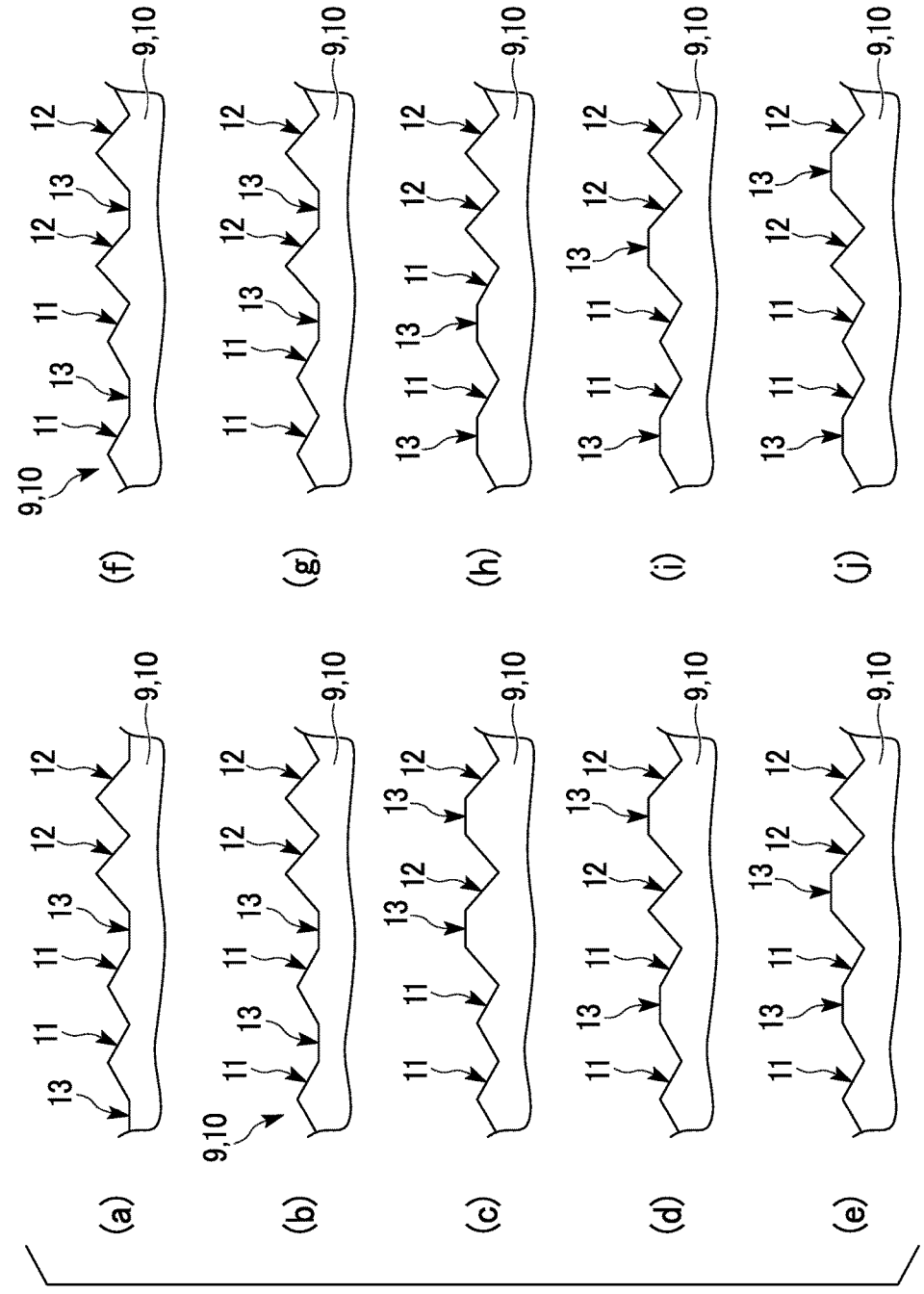
FIG. 13 is a cross-sectional view showing a configuration example in which an arrangement of a first prism, a second prism, and a flat surface is different in the prism surface.
Figure 14:
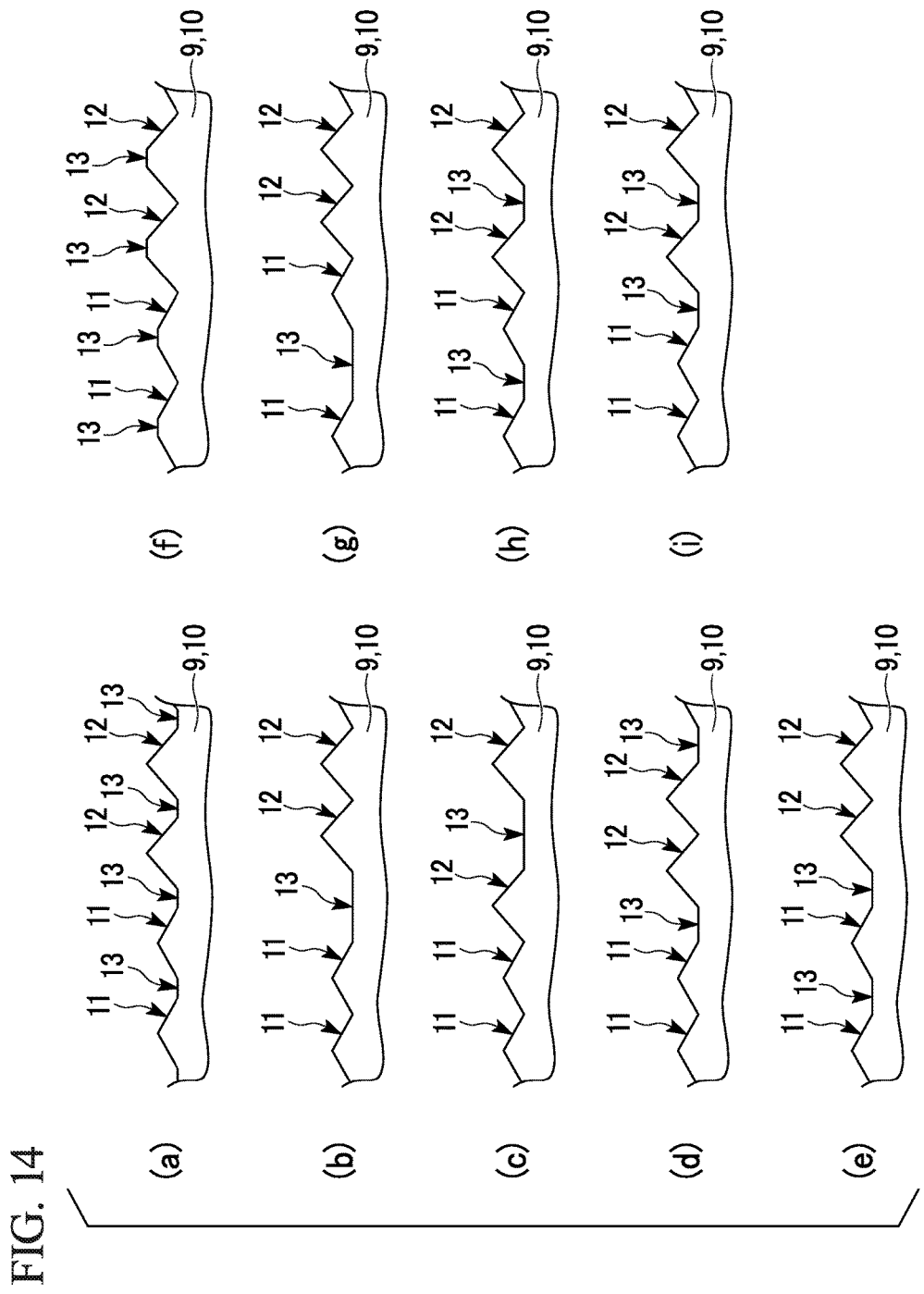
FIG. 14 is a cross-sectional view showing a configuration example in which an arrangement of a first prism, a second prism, and a flat surface is different in the prism surface.

In the prism surfaces 9 and 10, examples in which an arrangement of the first prism 11, the second prism 12, and the flat surface 13 is different are shown in parts (a) to (j) of FIG. 13 and parts (a) to (i) of FIG. 14.

Figure 15:
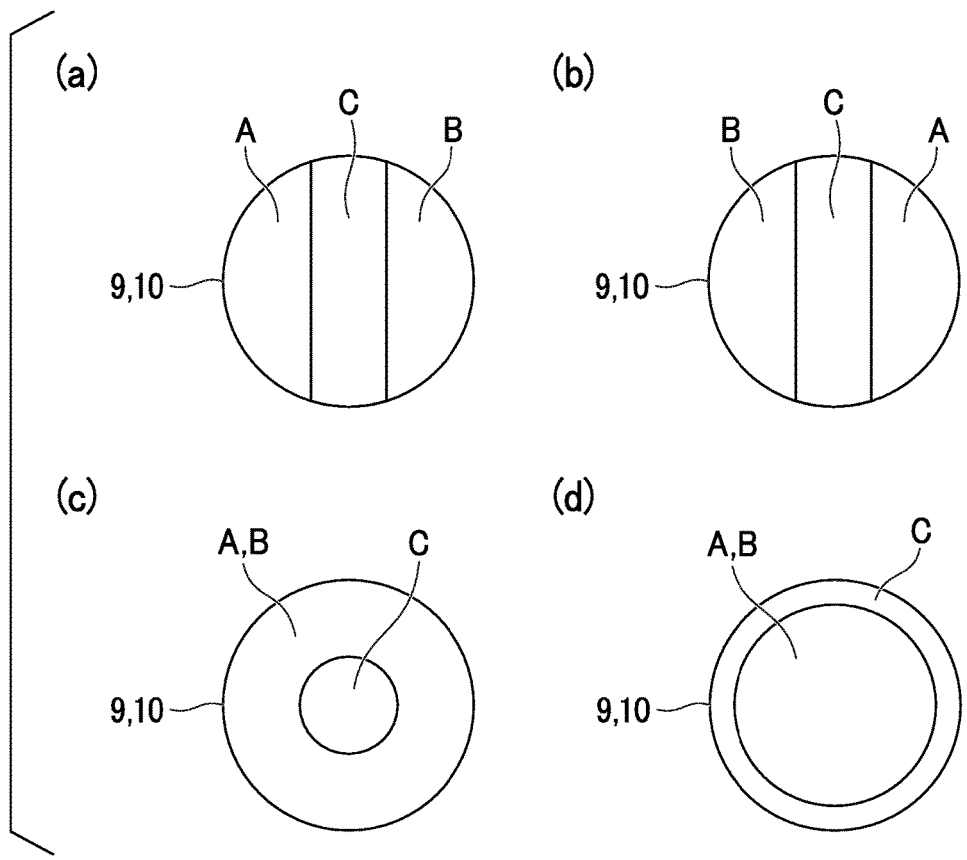
FIG. 15 is a plan view showing a configuration example in which a first prism, a second prism, and a flat surface are disposed in respective regions on the prism surface.

Further, the prism surfaces 9 and 10 are not necessarily limited to the configuration in which the first prism 11, the second prism 12, and the flat surface 13 are periodically or randomly arranged, and for example, as shown in parts (a) to (d) FIG. 15, a configuration in which the first prism 11, the second prism 12, and the flat surface 13 are disposed in regions A to C, respectively, may also be provided.

Further, in parts (a) to (d) of FIG. 15, in surfaces of the prism surfaces 9 and 10, differences of a distribution of the region A in which the first prism 11 is disposed, the region B in which the second prism 12 is disposed, and the region C in which the flat surface 13 is disposed are schematically shown.

Figure 16:
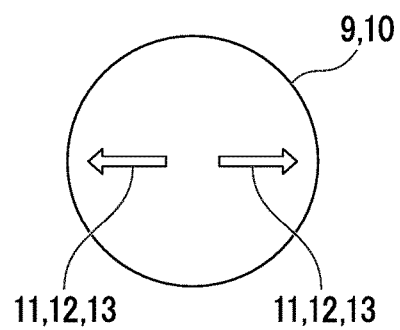
FIG. 16 is a plan view showing a configuration example in which an abundance ratio of a first prism, a second prism, and a flat surface are made different with each other in the prism surface.

Further, in the prism surfaces 9 and 10, in the configuration in which the first prism 11, the second prism 12, and the flat surface 13 are disposed in parallel, for example, as shown in FIG. 16, an abundance ratio thereof may differ.

Further, in FIG. 16, in the configuration in which the first prism 11, the second prism 12, and the flat surface 13 are disposed in parallel, a case in which distribution (an abundance ratio) of the first prism 11, the second prism 12, and the flat surface 13 differs in directions of arrows is schematically shown. That is, in the configuration shown in FIG. 16, in the first prism 11, the second prism 12, and the flat surface 13 disposed in parallel in the directions of arrows, the abundance ratio of any one may be increased or decreased in the direction of the arrow.

Figure 17:
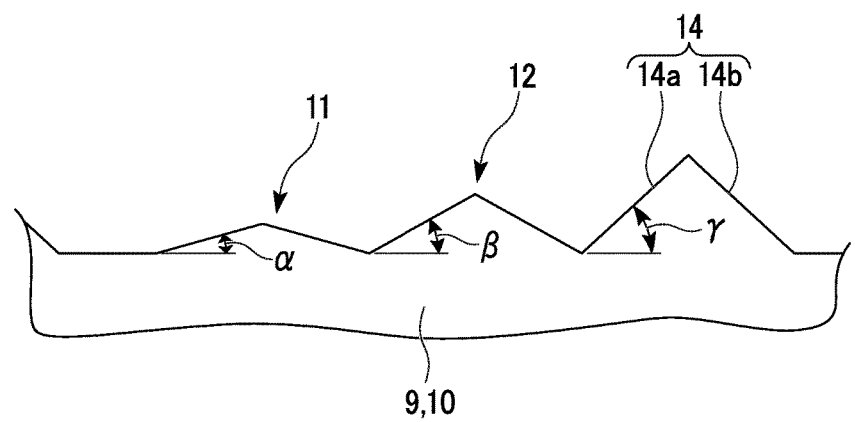
FIG. 17 is a cross-sectional view showing a configuration example to which a third prism is further added in the prism surface.

In addition, the prism surfaces 9 and 10 are not limited to the configuration in which two prisms (the first prism 11 and the second prism 12) having different angles of inclined surfaces are disposed, and a configuration in which a plurality of (three or more) prisms having different angles of inclined surfaces are included may also be provided. Accordingly, for example, as shown in FIG. 17, a configuration in which, in addition to the first prism 11 and the second prism 12, a third prism 14 having a pair of third inclined surfaces 14a and 14b inclined in opposite directions with each other at a third inclination angle γ different from the first inclination angle α and the second inclination angle β is included may also be provided.

In addition, the prism surfaces 9 and 10 are not limited to the configuration in which two of the first flat surface 13a and the second flat surface 13b are disposed, a configuration in which a plurality of (three or more) flat surfaces 13 having different widths or heights are disposed may also be provided. Further, as the plurality of flat surfaces 13 are continuously formed, one flat surface 13 may also be provided.

Figure 18:
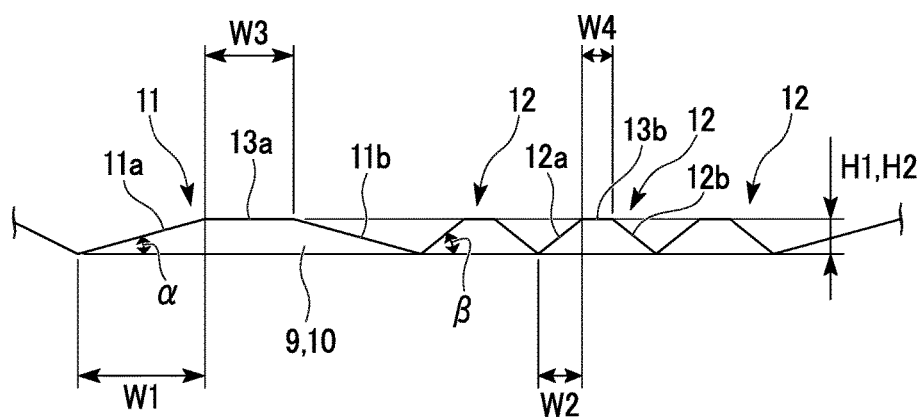
FIG. 18 is a cross-sectional view showing a configuration example in which a height of a flat surface is uniform in the prism surface.

In addition, in the prism surfaces 9 and 10, as shown in FIG. 18, a configuration in which, by dividing the second prism 12 having the second inclination angle β larger than the first inclination angle α of the first prism 11, the heights H1 and H2 of the prisms 11 and 12 (the flat surfaces 13a and 13b) are made same with each other while making the abundance ratio of the first inclined surfaces 11a and 11b and the second inclined surfaces 12a and 12b equal to the abundance ratio of the first flat surface 13a and the second flat surface 13b may also be provided.

For example, in the configuration shown in FIG. 18, when the ratio of the first inclination angle α and the second inclination angle β is 1:3, the second prism 12 is divided into three parts and a ratio of the numbers of the first prisms 11 and the second prisms 12 is made to 1:3. Accordingly, while the ratio of the width W1 of the first inclined surfaces 11a and 11b and the width W2 of the second inclined surfaces 12a and 12b is made to 3:1 and as a result the ratio of the width W3 of the first flat surface 13a and the width W4 of the second flat surface 13b becomes 3:1. On the other hand, it is possible to make a ratio of the height H1 of the first flat surface 13a and the height H2 of the second flat surface 13b to 1:1 (the same height) while an abundance ratio (width×number) of the first inclined surfaces 11a and 11b and the second inclined surfaces 12a and 12b and an abundance ratio (width×number) of the first flat surface 13a and the second flat surface 13b is maintained as 1:1 (the same abundance ratio).

In the prism surfaces 9 and 10, a quantity of light passing through the prisms 11 and 12 and the flat surface 13 is in proportion to the abundance ratios. Further, the abundance ratios disclosed in the present invention are referred to a value obtained by a product of luminous intensity of the light passing through the surfaces and an area when the light passing through the surfaces is projected toward a surface perpendicular to an optical axis. Accordingly, when light distribution of the light L emitted from the light source 2 is adjusted, it is more important to arrange the angles of the inclined surfaces of the prisms 11 and 12 and the abundance ratios of the surfaces than adjusting the arrangements (array) of the prisms 11 and 12 or the flat surface 13.

Further, while the light source 2 has a configuration in which LEDs are used as the light emitting elements 5, a light emitting element such as a laser diode (LD) or the like may be used instead of an LED. In addition, the light source 2 is not limited to the configuration including the plurality of light emitting elements 5 but may include a configuration including a plurality of light emitting surfaces. That is, an LED array element in which the plurality of light emitting surfaces 5a are disposed in parallel in a matrix in the leftward/rightward direction (the first direction) and the upward/downward direction (the second direction) in surfaces perpendicular to each other may also be used as the light source 2.

In addition, the plurality of light emitting elements 5 or light emitting surfaces 5a are not limited to the configuration in which they are disposed in parallel in the matrix in the leftward/rightward direction (the first direction) and the upward/downward direction (the second direction), and may have a configuration in which they are arranged in any one of the directions. In this case, the light distribution adjusting element 4 may have a configuration having only one of the prism surfaces 9 and 10 corresponding to the direction in which the plurality of light emitting elements 5 or light emitting surfaces 5a are arranged. Further, the plurality of light emitting elements 5 or light emitting surfaces 5a are not limited to the directions perpendicular to each other, and may have a configuration in which they are disposed next to each other in two directions within surfaces intersecting each other. Even in this case, in the light distribution adjusting element 4, directions of the prism surfaces 9 and 10 may be set to correspond to the direction in which the plurality of light emitting elements 5 or light emitting surfaces 5a are arranged.

In addition, the projection lens 3 is not limited to the case constituted by the above-mentioned two lenses 7 and 8, and may have a configuration constituted by one lens. In addition, three or more lenses may be provided.

In addition, while the light distribution adjusting element 4 has the configuration in which the first prism surface 9 is disposed at the rear surface thereof and the second prism surface 10 is disposed at the front surface, the light distribution adjusting element 4 may have a configuration in which the second prism surface 10 is disposed at the rear surface and the first prism surface 9 is disposed at the front surface. Further, a configuration in which the light distribution adjusting element 4 is divided into a first light distribution adjusting element having the first prism surface 9 and a second light distribution adjusting element having the second prism surface 10 may also be provided.

In addition, the light distribution adjusting element 4 is not limited to the configuration disposed between the first lens 7 and the second lens 8, and may be disposed on an optical path between the light source 2 and the projection lens 3. However, the light distribution adjusting element 4 may be disposed at a position at which the light L emitted from the light source 2 becomes parallel light. In addition, the above description is also applied to the first light distribution adjusting element and the second light distribution adjusting element.

EXAMPLES

Hereinafter, effects of the present invention will become further apparent from examples. Further, the present invention is not limited to the following examples and may be appropriately varied without departing from the scope of the present invention.

In an example, during a light distribution adjustment of light by the light distribution adjusting element 4, like in Examples 1 to 6 shown in FIGS. 19 to 24, a light source image when a shift amount of the light source images M1 and M2 is varied by the first prism 11 and the second prism and a luminous intensity distribution thereof were obtained by varying the ratio of the first inclination angle α and the second inclination angle β.

Example 1

Figure 19:
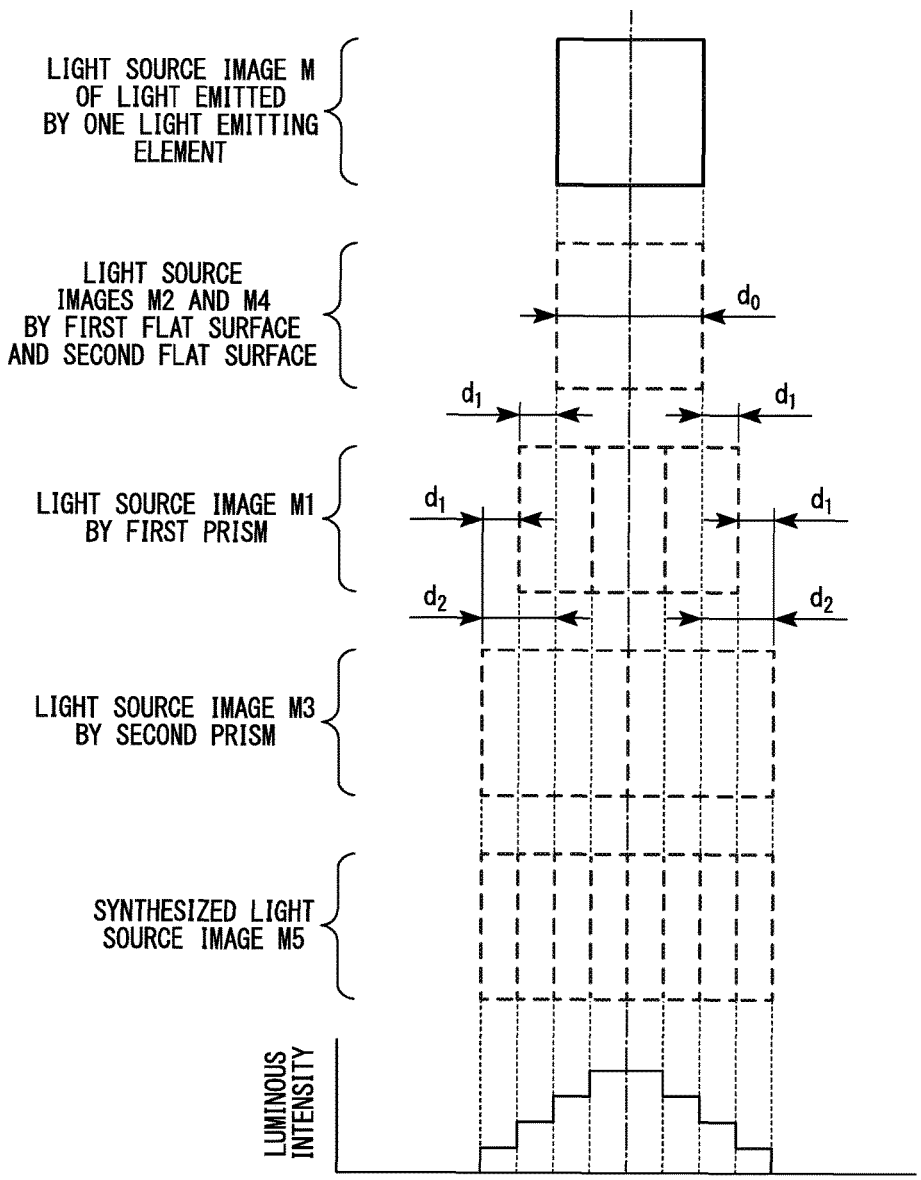
FIG. 19 is a view showing a light source image of light and a luminous intensity distribution thereof adjusted by a light distribution adjusting element of Example 1.

A light source image of light 1 and a luminous intensity distribution thereof adjusted by a light distribution adjusting element of Example 1 are shown in FIG. 19.

As shown in FIG. 19, in the configuration shown in FIG. 4, Example 1 is the case in which the ratio of the first inclination angle α and the second inclination angle β is changed to 1:2 and a shift amount $d_1$ of the light source image M1 according to the first inclination angle α of the first prism 11 is ¼ times ($d_0/4$) a width $d_0$ of the light source images M2 and M4 by the first flat surface 13a and the second flat surface 13b. In this case, a shift amount $d_2$ of the light source image M3 according to the second inclination angle β of the second prism 12 is two times ($2d_1=d_0/2$) the shift amount $d_1$ of the light source image M1.

Accordingly, in Example 1, the light source image M5 obtained by synthesizing the light source images M1 to M4 has a luminous intensity distribution in which the luminous intensity is gradually (in a stepped manner) decreased from a center toward both ends thereof. As a result, in Example 1, the projection image M5 in which the luminous intensity is smoothly varied in a direction in which the light source image M is shifted is obtained.

Example 2

Figure 20:
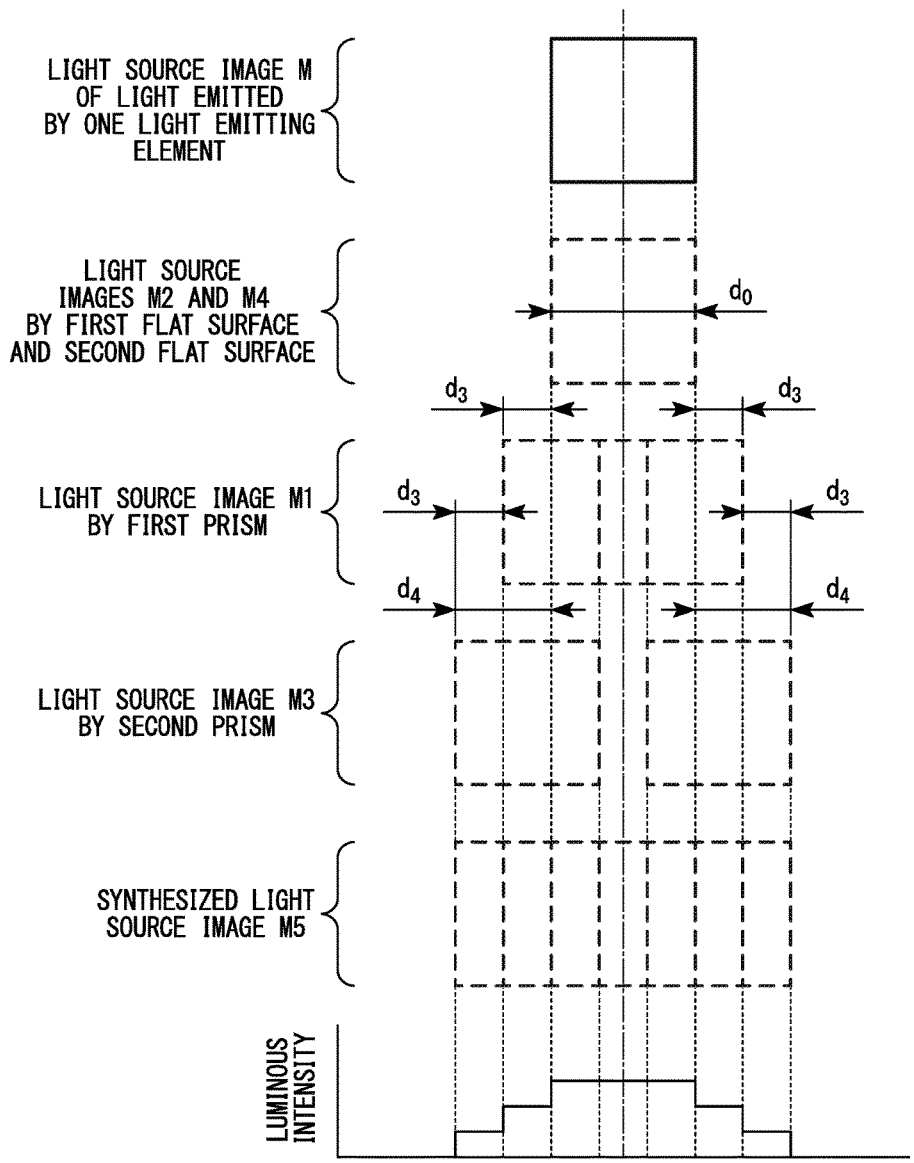
FIG. 20 is a view showing a light source image of light and a luminous intensity distribution thereof adjusted by a light distribution adjusting element of Example 2.

A light source image of light and a luminous intensity distribution thereof adjusted by a light distribution adjusting element of Example 2 are shown in FIG. 20.

As shown in FIG. 20, in the configuration shown in FIG. 4, Example 2 is the case in which the ratio of the first inclination angle α and the second inclination angle β is changed to 1:2 and a shift amount $d_3$ of the light source image M1 according to the first inclination angle α of the first prism 11 is ⅓ times ($d_0/3$) the width $d_0$ of the light source images M2 and M4 by the first flat surface 13a and the second flat surface 13b. In this case, a shift amount $d_4$ of the light source image M3 according to the second inclination angle β of the second prism 12 is two times ($2d_3=2d_0/3$) the shift amount $d_3$ of the light source image M1.

Accordingly, in Example 2, while the light source image M5 obtained by synthesizing the light source images M1 to M4 has a luminous intensity distribution in which the luminous intensity is gradually decreased from a center to both ends thereof, the luminous intensity of the center is flatter than that of Example 1 and a variation in the luminous intensity toward both of the ends is gentler than that of Example 1. In this way, in Example 2, the projection image M5 in which the luminous intensity is smoothly varied in a direction in which the light source image M is shifted is obtained.

Example 3

Figure 21:
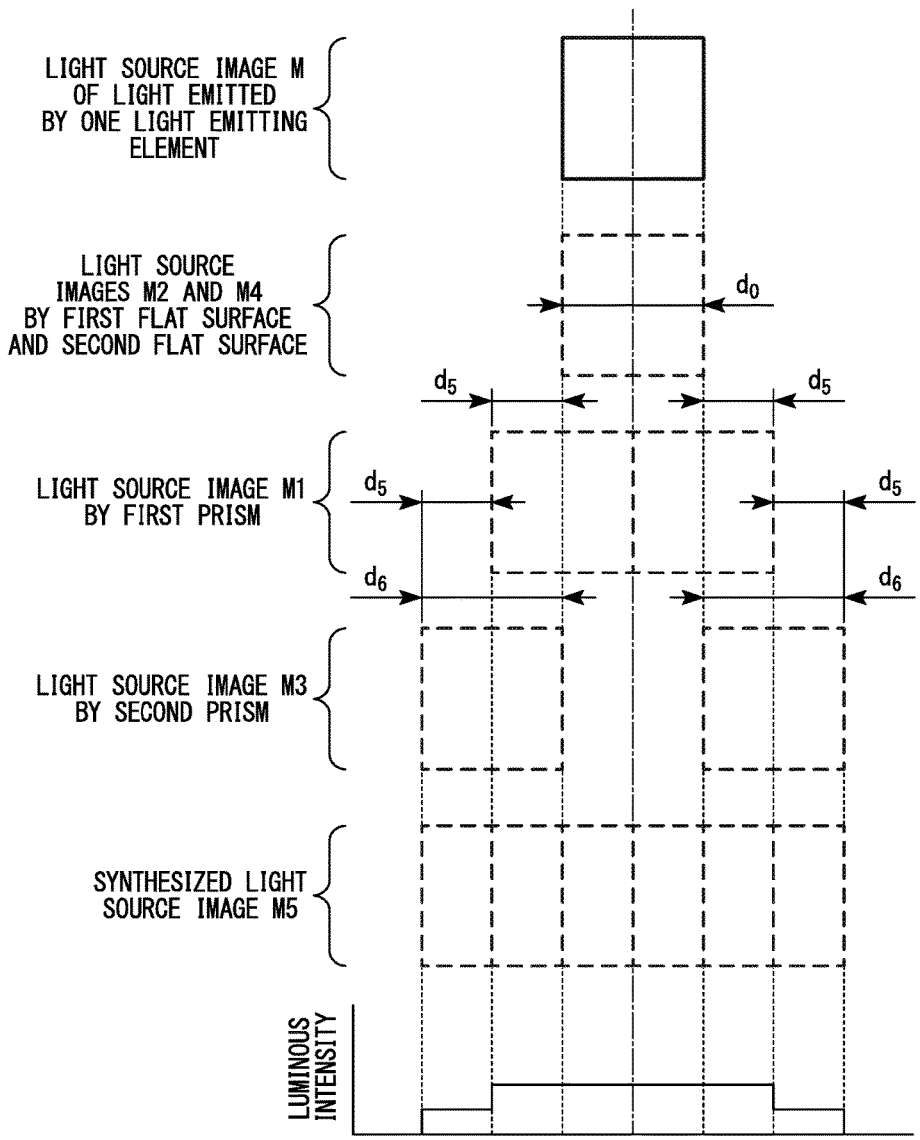
FIG. 21 is a view showing a light source image of light and a luminous intensity distribution thereof adjusted by a light distribution adjusting element of Example 3.

A light source image of light and a luminous intensity distribution thereof adjusted by a light distribution adjusting element of Example 3 are shown in FIG. 21.

As shown in FIG. 21, in the configuration shown in FIG. 4, Example 3 is the case in which the ratio of the first inclination angle α and the second inclination angle β is changed to 1:2 and a shift amount $d_5$ of the light source image M1 corresponding to the first inclination angle α of the first prism 11 is ½ times ($d_0/2$) the width $d_0$ of the light source images M2 and M4 by the first flat surface 13a and the second flat surface 13b. In this case, a shift amount $d_6$ of the light source image M3 corresponding to the second inclination angle β of the second prism 12 is two times ($2d_5=d_0$) the shift amount $d_5$ of the light source image M1.

Accordingly, in Example 3, the light source image M5 obtained by synthesizing the light source images M1 to M4 has a luminous intensity distribution in which the luminous intensity is also uniformized in a direction in which the light source image M is shifted. In this case, as the light source images M5 corresponding to the neighboring light emitting elements 5 overlap, a dark section (a region toward which light is not radiated) corresponding to a gap of the neighboring light emitting elements 5 is eliminated, and the luminous intensity can be uniformized.

Example 4

Figure 22:
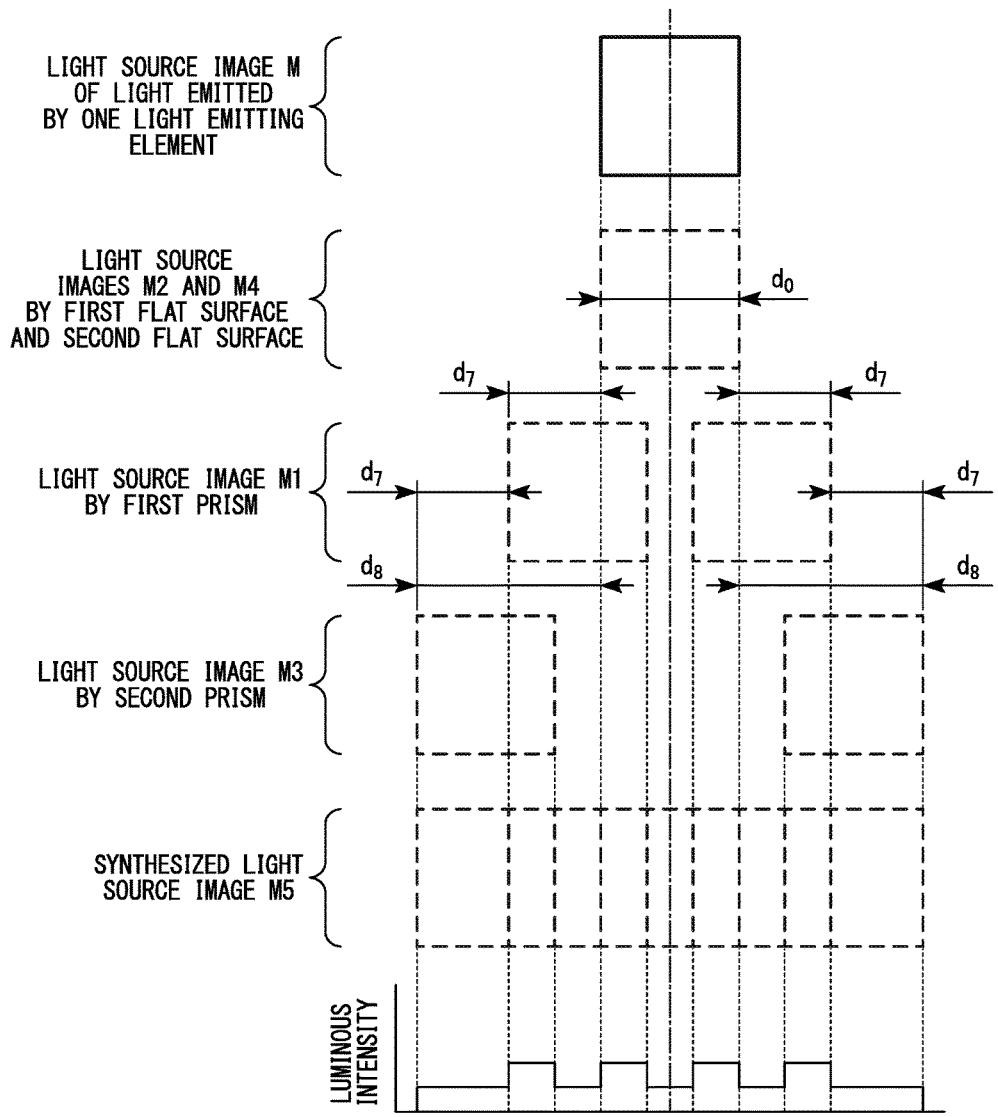
FIG. 22 is a view showing a light source image of light and a luminous intensity distribution thereof adjusted by a light distribution adjusting element of Example 4.

A light source image of light and a luminous intensity distribution thereof adjusted by a light distribution adjusting element of Example 4 are shown in FIG. 22.

As shown in FIG. 22, in the configuration shown in FIG. 4, Example 4 is the case in which the ratio of the first inclination angle α and the second inclination angle β is changed to 1:2 and a shift amount $d_7$ of the light source image M1 corresponding to the first inclination angle α of the first prism 11 is ⅔ times ($2d_0/3$) the width $d_0$ of the light source images M2 and M4 by the first flat surface 13a and the second flat surface 13b. In this case, a shift amount $d_8$ of the light source image M3 corresponding to the second inclination angle β of the second prism 12 is two times ($2d_7=4d_0/3$) the shift amount $d_7$ of the light source image M1.

Accordingly, in Example 4, the light source image M5 obtained by synthesizing the light source images M1 to M4 has a luminous intensity distribution in which the luminous intensity is uniformized in a direction in which the light source image M is shifted and a position at which luminous intensity is high but a position at which luminous intensity is low are periodically arranged. However, when brightness of light actually emitted by the light emitting elements 5 is further lowered at both ends than the center, uniform luminous intensity distribution can be obtained.

Example 5

Figure 23:
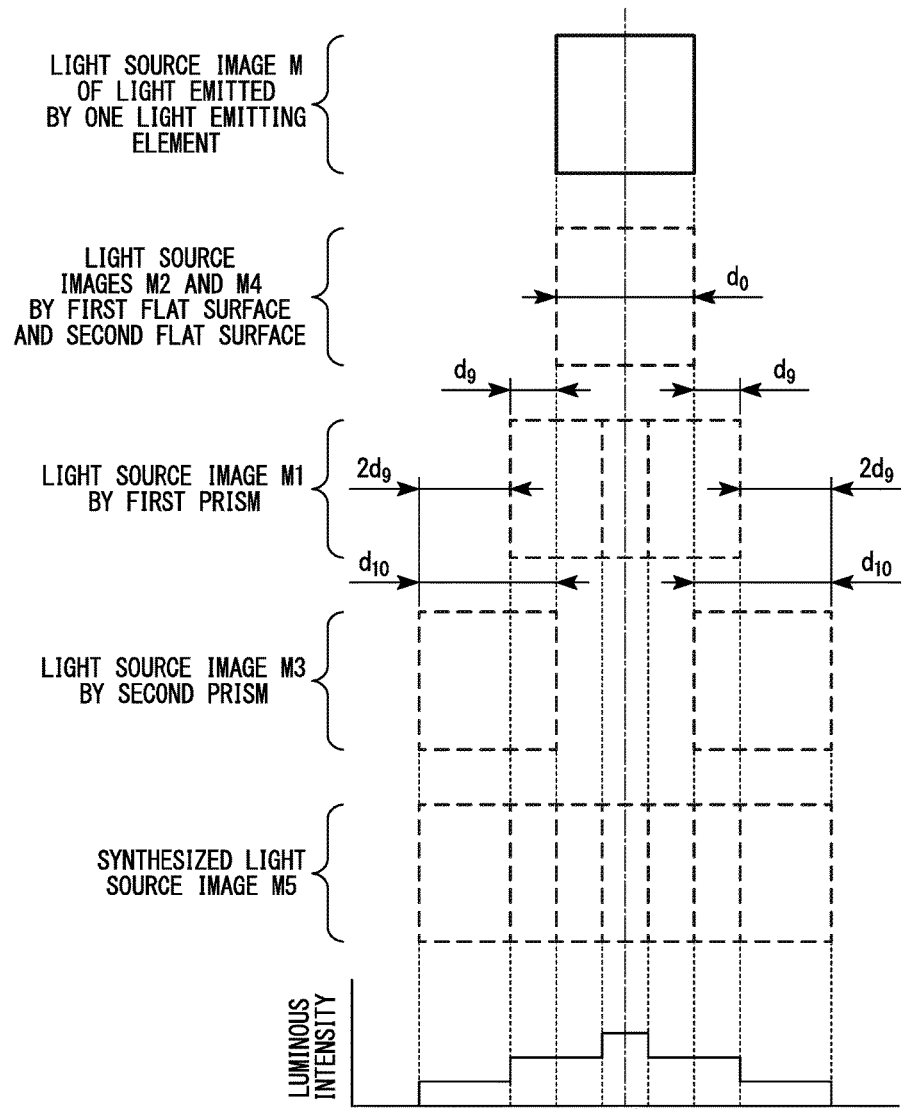
FIG. 23 is a view showing a light source image of light and a luminous intensity distribution thereof adjusted by a light distribution adjusting element of Example 5.

A light source image of light and a luminous intensity distribution thereof adjusted by a light distribution adjusting element of Example 5 are shown in FIG. 23.

As shown in FIG. 23, in the configuration shown in FIG. 4, Example 5 is the case in which the ratio of the first inclination angle α and the second inclination angle β is changed to 1:3 and a shift amount $d_9$ of the light source image M1 corresponding to the first inclination angle α of the first prism 11 is ⅓ times ($d_0/3$) the width $d_0$ of the light source images M2 and M4 by the first flat surface 13a and the second flat surface 13b. In this case, a shift amount $d_{10}$ of the light source image M3 corresponding to the second inclination angle β of the second prism 12 is three times ($3d_9=d_0$) the shift amount $d_9$ of the light source image M1.

Accordingly, in Example 5, while the light source image M5 obtained by synthesizing the light source images M1 to M4 has a luminous intensity distribution in which the luminous intensity is gradually decreased from the center to both ends thereof, variation in the luminous intensity is gentler than Example 1. As a result, in Example 5, the projection image M5 in which the luminous intensity is smoothly varied in a direction in which the light source image M is shifted is obtained.

Example 6

Figure 24:
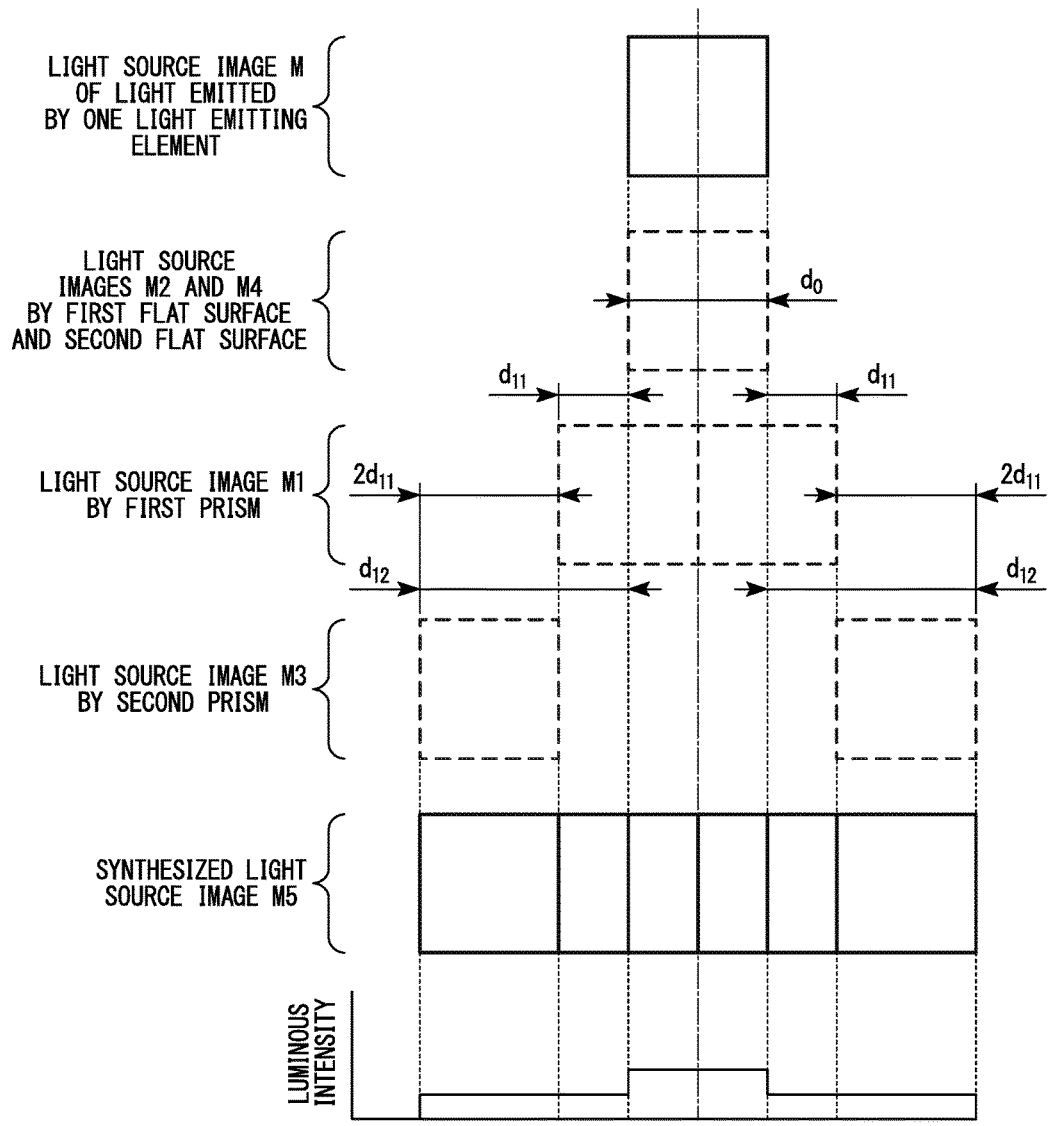
FIG. 24 is a view showing a light source image of light and a luminous intensity distribution thereof adjusted by a light distribution adjusting element of Example 6.

A light source image of light and a luminous intensity distribution thereof adjusted by a light distribution adjusting element of Example 6 are shown in FIG. 24.

As shown in FIG. 24, in the configuration shown in FIG. 4, Example 6 is the case in which the ratio of the first inclination angle α and the second inclination angle β is changed to 1:3 and a shift amount $d_{11}$ of the light source image M1 corresponding to the first inclination angle α of the first prism 11 is ½ times ($d_0/2$) the width $d_0$ of the light source images M2 and M4 by the first flat surface 13a and the second flat surface 13b. In this case, a shift amount $d_{12}$ of the light source image M3 corresponding to the second inclination angle β of the second prism 12 is three times ($3d_{11}=3\ d_0/2$) the shift amount $d_{11}$ of the light source image M1.

Accordingly, in Example 6, while the light source image M5 obtained by synthesizing the light source image M1 to M4 has a luminous intensity distribution in which the luminous intensity is gradually decreased from a center to both ends thereof, variation in the luminous intensity is gentler than that of Example 5. As a result, in Example 6, the projection image M5 in which the luminous intensity is smoothly varied in a direction in which the light source image M is shifted is obtained.

As described above, according to the present invention, light distribution of light can be varied by adjusting various parameters (a width, an angle (shift amount), a ratio thereof, and the like) of the first prism surface 9 and the second prism surface 10 that constitute the light distribution adjusting element 4 in addition to uniformizing the light distribution of the light.

Further, in Examples 1 to 6, the light source image and the luminous intensity distribution thereof when light distribution of the light emitted from any one light emitting element is adjusted by the light distribution adjusting element are shown, and it seems that light distribution of the light is not uniformed when one light source image is seen. However, in the light source image and the luminous intensity distribution obtained by overlapping (synthesizing) light source images corresponding to neighboring light emitting elements, like the case shown in FIG. 8, as the light source images corresponding to the neighboring light emitting elements overlap, a dark section (a region toward which light is not radiated) corresponding to a gap between the neighboring light emitting element is eliminated, and a further uniformized (smoothened) luminous intensity distribution can be obtained.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle lamp comprising:
    a light source including a plurality of light emitting elements or light emitting surfaces;
    a projection lens that projects light emitted from the light source; and
    a light distribution adjusting element that adjusts light distribution of the light emitted from the light source,
    wherein the light distribution adjusting element has a plurality of prisms having different angles of inclined surfaces corresponding to a direction in which the plurality of light emitting elements or light emitting surfaces are arranged, and a prism surface in which at least one or a plurality of flat surfaces are arranged, and
    the plurality of prisms include a first prism having a pair of first inclined surfaces that are inclined in opposite directions with each other at a first inclination angle, and a second prism having a pair of second inclined surfaces that are inclined in opposite directions with each other at a second inclination angle different from the first inclination angle.

2. The vehicle lamp according to claim 1,
    wherein the first prism, the second prism and the flat surface are periodically or randomly disposed in parallel on the prism surface.

3. The vehicle lamp according to claim 2,
    wherein the first prism and the second prism are alternately disposed in parallel on the prism surface, and
    the flat surface is disposed at an apex section side and/or a bottom section side of any one of the first prism and the second prism.

4. The vehicle lamp according to claim 3,
wherein the plurality of flat surfaces comprise a first flat surface formed between the pair of first inclined surfaces and a second flat surface formed between the pair of second inclined surfaces.

5. The vehicle lamp according to claim 3,
wherein the plurality of flat surfaces comprise a first flat surface formed between one of the first inclined surface and one of the second inclined surface, which are adjacent to each other, and a second flat surface formed between the other first inclined surface and the other second inclined surface, which are adjacent to each other.

6. The vehicle lamp according to claim 1,
wherein the first prism, the second prism, and the flat surface are disposed in different regions on the prism surface.

7. The vehicle lamp according to claim 1,
wherein a ratio of the first inclination angle and the second inclination angle is 1:3 or 1:2.

8. The vehicle lamp according to claim 7,
wherein an abundance ratio of the first inclined surface, the second inclined surface, and the flat surface in the direction in which the plurality of prisms are arranged is 1:1:1.

9. The vehicle lamp according to claim 1,
wherein the plurality of prisms comprise a third prism having a pair of third inclined surfaces inclined in opposite directions with each other at a third inclination angle different from the first inclination angle and the second inclination angle.

10. The vehicle lamp according to claim 1,
wherein the light source has a structure in which the plurality of light emitting elements or light emitting surfaces are disposed in parallel in a first direction and a second direction on surfaces intersecting each other, and the light distribution adjusting element has a first prism surface corresponding to the first direction at one surface thereof and a second prism surface corresponding to the second direction at the other surface thereof, which are opposite to each other, as the prism surfaces.

11. The vehicle lamp according to claim 1,
wherein the projection lens has a structure in which a first lens and a second lens are disposed in parallel, and the light distribution adjusting element is disposed between the first lens and the second lens.

* * * * *